US011873674B2

(12) United States Patent
Fumagalli

(10) Patent No.: US 11,873,674 B2
(45) Date of Patent: Jan. 16, 2024

(54) PROFILED PLASTIC SECTION FOR A METAL/PLASTIC COMPOSITE PROFILED SECTION

(71) Applicant: ENSINGER GmbH, Nufringen (DE)

(72) Inventor: Adolfo Giuseppe Fumagalli, Vimercate (IT)

(73) Assignee: ENSINGER GmbH

( * ) Notice: Subject to any disclaimer, the term of this patent is extended or adjusted under 35 U.S.C. 154(b) by 0 days.

(21) Appl. No.: 17/858,534

(22) Filed: Jul. 6, 2022

(65) Prior Publication Data

US 2022/0333432 A1 Oct. 20, 2022

Related U.S. Application Data

(63) Continuation of application No. 16/338,979, filed as application No. PCT/IB2017/056315 on Oct. 12, 2017, now Pat. No. 11,414,917.

(30) Foreign Application Priority Data

Oct. 13, 2016 (DE) ......................... 102016119580.4

(51) Int. Cl.
*E06B 3/263* (2006.01)
*E06B 1/18* (2006.01)
(Continued)

(52) U.S. Cl.
CPC ............ *E06B 3/26303* (2013.01); *E06B 1/18* (2013.01); *E06B 1/28* (2013.01); *E06B 1/30* (2013.01);
(Continued)

(58) Field of Classification Search
CPC ..... E06B 1/18; E06B 1/28; E06B 1/30; E06B 3/26303; E06B 3/2632; E06B 2003/26312;
(Continued)

(56) References Cited

U.S. PATENT DOCUMENTS 4,184,297 A * 1/1980 Casamayor ........... E06B 3/5871 D25/123
4,189,520 A * 2/1980 Gauchel .................. B29C 48/11 52/309.1
(Continued)

FOREIGN PATENT DOCUMENTS

DE 9318201 U1 3/1994
DE 19528498 C1 6/1996
(Continued)

*Primary Examiner* — Brian E Glessner
*Assistant Examiner* — Adam G Barlow
(74) *Attorney, Agent, or Firm* — QUARLES & BRADY LLP

(57) ABSTRACT

The invention relates to a profiled plastic section (1) for a metal/plastic composite profiled section (31). The profiled plastic section (1) comprises a first profiled element (2) and at least one second profiled element (3). The first profiled element (2) and the second profiled element (3) together form a latching mechanism (4, 9; 5, 10; 6, 11), by means of which a form-fitting connection can preferably be produced between the first profiled element (2) and the second profiled element (3) in a width direction (x) and in a height direction (y). The first profiled element (2) and the second profiled element (3) overlap preferably over a large area when the form-fitting connection is produced between the first profiled element (2) and the second profiled element (3), and the form-fitting connection can be produced on the cross-sectional plane (x, y) between the first profiled element (2) and the second profiled element (3) by latching the profiled elements (2, 3) of the profiled plastic section (1). The form-fitting connection between the first profiled element (2) and the second profiled element (3) is designed such that a movement of the first profiled element (2) and the second profiled element (3) in a longitudinal direction (z) of the profiled plastic section (1) is allowed when a first metal component (29) is connected to the first profiled element (2)
(Continued)

and a second metal component (30) is connected to the second profiled element (3) preferably in a shear-resistant manner. The profiled plastic section (1) can likewise also be designed with more than two profiled elements (2, 3), and the basic principle according to the invention of generating a shear-free plastic/metal composite profiled section (31) can be carried over.

12 Claims, 12 Drawing Sheets

(51) Int. Cl.
*E06B 1/28* (2006.01)
*E06B 1/30* (2006.01)

(52) U.S. Cl.
CPC .. *E06B 3/2632* (2013.01); *E06B 2003/26312* (2013.01); *E06B 2003/26316* (2013.01); *E06B 2003/26329* (2013.01)

(58) Field of Classification Search
CPC . E06B 2003/26316; E06B 2003/26329; E06B 2003/2633; E06B 2003/26352; E06B 2003/26379; E06B 3/273; E06B 3/26305
USPC ... 52/204.1, 204.5, 393, 395, 396.05, 573.1, 52/396.01, 501, 504
See application file for complete search history.

(56) References Cited

U.S. PATENT DOCUMENTS

| | | | | | |
|---|---|---|---|---|---|
| 4,524,112 | A * | 6/1985 | Willert | E06B 3/273 52/204.593 |
| 4,614,062 | A * | 9/1986 | Sperr | E06B 7/231 49/504 |
| 6,035,600 | A * | 3/2000 | Habicht | E06B 3/26305 52/656.5 |
| 6,202,353 | B1 * | 3/2001 | Giacomelli | E06B 3/2675 49/504 |
| 7,096,640 | B1 * | 8/2006 | Chevian | E06B 3/2675 52/204.591 |
| 7,104,019 | B2 * | 9/2006 | Brunnhofer | E06B 3/2632 52/309.9 |
| 7,987,633 | B2 * | 8/2011 | Lenox | E06B 3/26303 49/63 |
| 8,322,090 | B2 * | 12/2012 | Moriya | E06B 7/10 52/204.593 |
| 9,388,627 | B2 * | 7/2016 | Rawlings | E06B 3/26303 |
| 9,920,568 | B2 * | 3/2018 | Rethmeier | E06B 3/26303 |
| 10,184,288 | B2 * | 1/2019 | Blijweert | E06B 1/18 |
| 10,273,744 | B2 * | 4/2019 | Lebron | E06B 3/08 |
| 10,370,893 | B2 * | 8/2019 | Hooper, Jr. | E06B 3/26303 |
| 10,718,152 | B2 * | 7/2020 | Brandes | E06B 5/161 |
| 2005/0183351 | A1 * | 8/2005 | Brunnhofer | E06B 3/26305 52/579 |
| 2010/0175339 | A1 * | 7/2010 | Moriya | E06B 7/10 49/404 |
| 2010/0229479 | A1 * | 9/2010 | Burkhard | F16L 3/04 174/117 F |
| 2011/0011028 | A1 * | 1/2011 | Rawlings | E06B 3/263 52/656.5 |
| 2014/0053488 | A1 * | 2/2014 | Lenox | E06B 3/34 49/404 |
| 2015/0284988 | A1 * | 10/2015 | Kadavy | E06B 7/14 49/495.1 |
| 2015/0300000 | A1 * | 10/2015 | Gosling | E06B 1/34 52/741.1 |
| 2016/0145933 | A1 * | 5/2016 | Condon | E04B 2/90 52/204.5 |
| 2016/0201383 | A1 * | 7/2016 | Lenox | E05D 15/165 52/204.1 |
| 2016/0312519 | A1 * | 10/2016 | Blijweert | E06B 3/26303 |
| 2017/0234058 | A1 * | 8/2017 | Lebron | E06B 3/306 52/204.5 |
| 2019/0119973 | A1 * | 4/2019 | Hatzky | E06B 3/26303 |
| 2019/0284866 | A1 * | 9/2019 | Marinack, Jr. | E06B 3/26305 |
| 2021/0316513 | A1 * | 10/2021 | Möller | B29C 66/81465 |

FOREIGN PATENT DOCUMENTS

| | | | | |
|---|---|---|---|---|
| DE | 19956415 | C1 | 3/2001 | |
| DE | 202007004933 | U1 | 6/2007 | |
| DE | 202007016649 | U1 | 4/2008 | |
| DE | 102013010336 | A1 | 12/2013 | |
| EP | 2049775 | A | 12/1980 | |
| EP | 0829609 | A2 | 3/1998 | |
| EP | 2530230 | A2 | 12/2012 | |
| WO | 2015169670 | A1 | 11/2015 | |
| WO | WO-2015169670 | A1 * | 11/2015 | E06B 3/26303 |

* cited by examiner

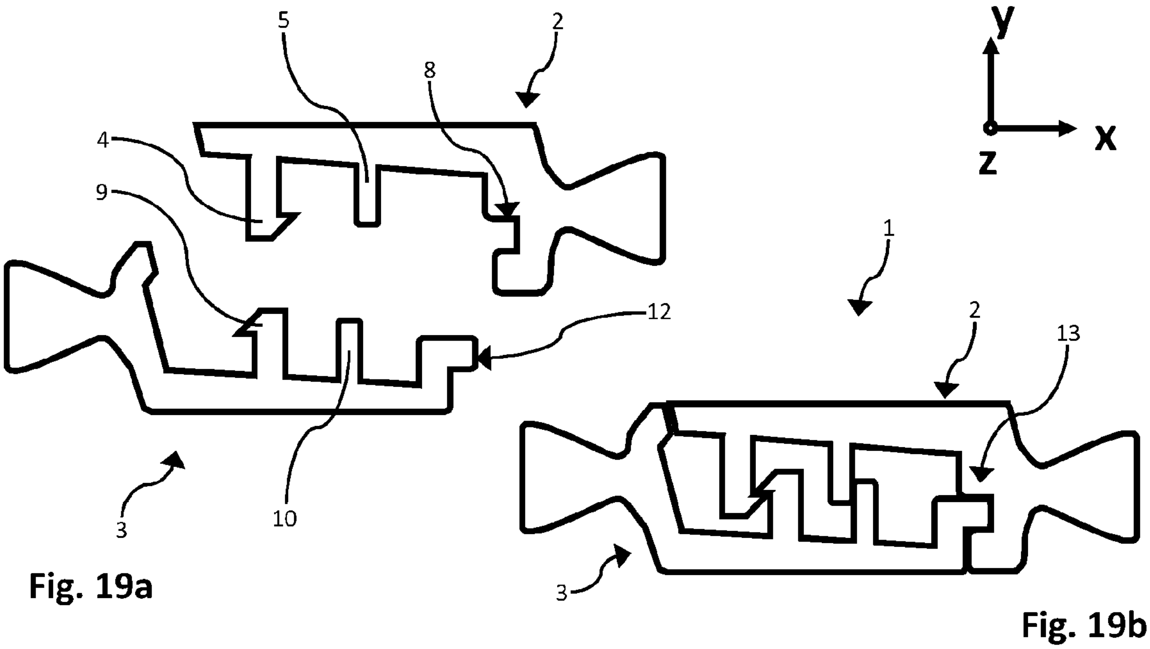
Fig. 19a
Fig. 19b
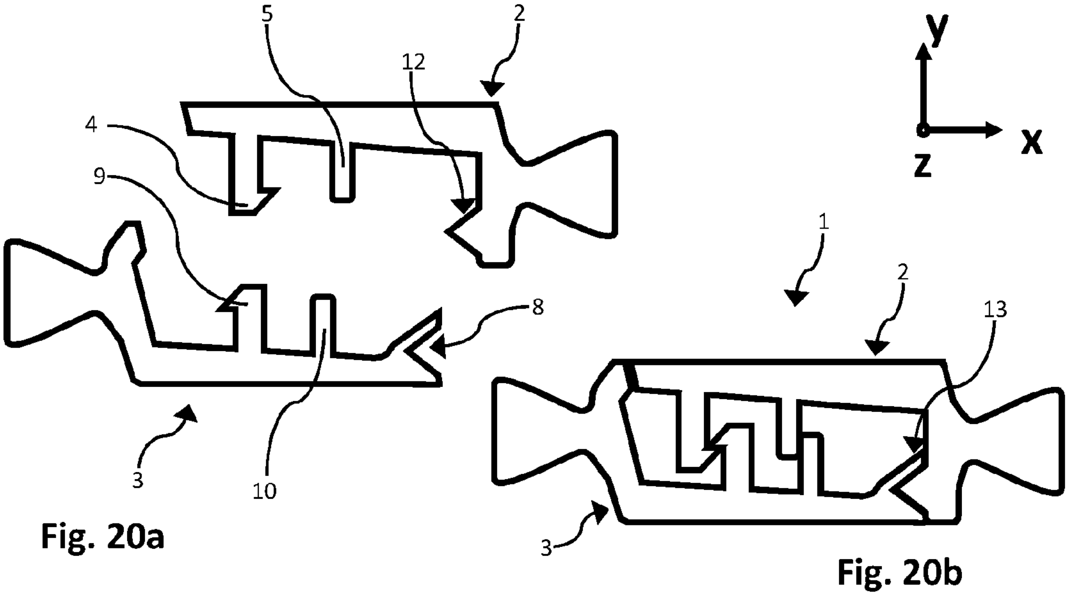
Fig. 20a
Fig. 20b

Fig. 23a
Fig. 23b
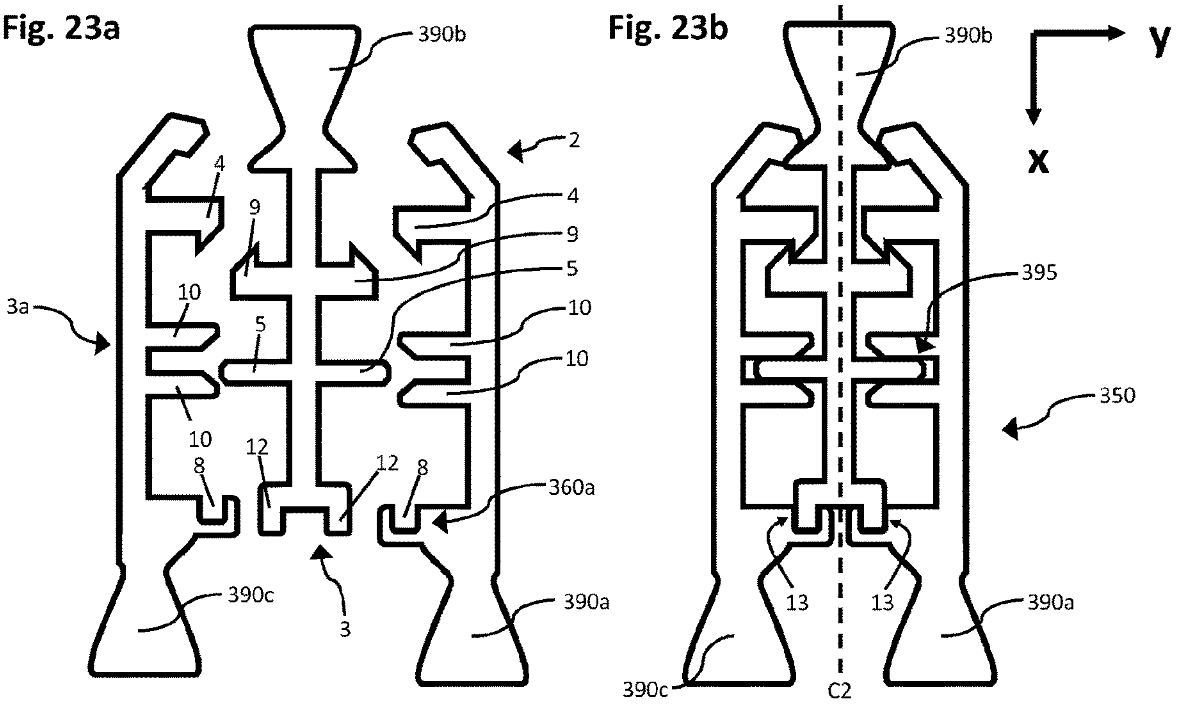
Fig. 24
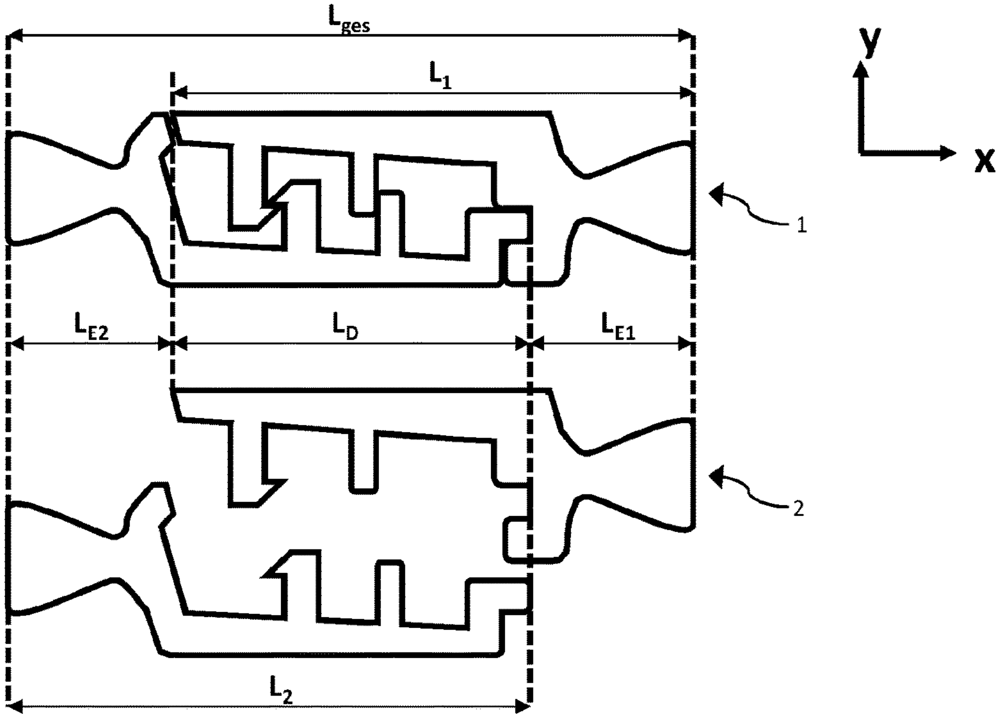

PROFILED PLASTIC SECTION FOR A METAL/PLASTIC COMPOSITE PROFILED SECTION

CROSS-REFERENCE TO RELATED APPLICATIONS

This application is a continuation of U.S. Application Ser. No. 16/338,979, filed on Apr. 2, 2019, and entitled "Profiled Plastic Section for a Metal/Plastic Composite Profiled Section", which is the U.S. national stage entry of International Application PCT/IB2017/056315, filed Oct. 12, 2017, which claims benefit of German Application 102016119580.4, filed Oct. 13, 2016, all of which are incorporated herein in their entirety by reference.

FIELD OF THE INVENTION

The present invention relates to a profiled plastic section for a metal/plastic composite profiled section. Additional claims are geared toward a metal/plastic composite profiled section with the profiled plastic section and a frame with the metal/plastic composite profiled section.

TECHNOLOGICAL BACKGROUND

The profiled plastic section serves in particular as an elementary element (e.g., as a component in profiled frame sections) for manufacturing thermally insulated windows, window walls, doors or façade elements, and is typically firmly attached with two profiled metal sections—usually extruded aluminum profiled sections, wherein the profiled plastic section is arranged between the profiled metal sections in terms of its longitudinal direction, which forms a metal/plastic composite profiled section. The profiled plastic section here forms a thermal separation plane between the two profiled metal sections, which reduces a heat flow from the one profiled metal section to the other profiled metal section, as a rule an outside and an inside profiled metal section.

If the two profiled metal sections are subjected to a variable longitudinal expansion, e.g., through exposure to different temperatures, shear stresses can arise between the profiled metal sections and profiled plastic sections, which can lead to undesirable deflections of the metal/plastic composite profiled section. Precisely in large-opening window or door systems, this can lead to functional limitations ("jamming", "squeaking") or functional failures caused by excessive warping of the profiled parts.

In order to resolve this problem, EP 0 829 609 B1 proposes a thermally insulated composite profiled section for doors, windows or facades, which consists of profiled metal sections and at least one insulating strip preferably made out of plastic, which is arranged between the profiled metal sections and connected with the profiled metal sections on the longitudinal edges. The insulating strip or the insulating strips arranged parallel to each other consist of two parts, wherein each insulating strip part is connected in a shear-resistant manner with the allocated profiled metal section, and the central connection between the two insulating strip parts is designed as a sliding guide. In the composite profiled section shown by EP 0 829 609 B1, a problem can be encountered in which the central connection can only absorb transverse forces to a limited extent, since it acts like a kind of ball-and-socket joint. In an extreme case, the ball can here be taken out of the socket due to the slight overlap, e.g., due to the elastic deformation of the socket, material fatigue or extreme environment conditions.

SUMMARY OF THE INVENTION

An object of the present invention is to provide an alternative, two-part profiled plastic section that prevents shear stresses from arising between the profiled metal sections and the profiled plastic section, and has an especially high stability and safety—in particular during exposure to high transverse tensile forces.

The object is achieved by the subject matter of the independent claims. Advantageous embodiments are part of the subclaims, the following specification and the figures.

A first aspect of the invention provides a shear-free profiled plastic section for a metal/plastic composite profiled section. The profiled plastic section has a shear-free design in its longitudinal direction, and can be used to produce a thermal separation between two profiled metal sections that can be connected with the profiled plastic section, in particular made out of aluminum, within the metal/plastic composite profiled section. The profiled plastic section comprises a first profiled element, in particular one made out of a first polymer material, and at least one separate, second profiled element, in particular one made out of a second polymer material. The profiled plastic section thus has a two-part design (first profiled element and second profiled element).

The insulating and damping properties (heat, sound, oscillation) of the profiled plastic section can be controlled by the material selected. The first polymer material can be the same as the second polymer material. However, it is not absolutely necessary that the profiled plastic section be fabricated out of a single material. The profiled elements can likewise consist of different polymer materials, wherein thermoplastic or thermosetting polymers are preferably used. Use can be made of polyamide, including polyamide 66, which has an especially high thermal stability, or polyamide 6, partially aromatic polyamides, polyester, polyether, polyphenylene ether, styrene polymers, styrene copolymers vinyl polymers, polyolefins, aromatic or aliphatic polyketones, polyphenylene sulfides and/or blends of the aforementioned polymers. Phenol-, melamine-, polyester- or vinyl ester resins can also be used. As a rule, the polymer material is fiber-reinforced (e.g., with glass, mineral, polymer, carbon, ceramic or metal fibers), so as to tailor the mechanical values or physical properties of the material to the application and improve them. In particular, the materials can also be given a porous (e.g., closed-pore) design via specific manufacturing processes.

Furthermore, the first profiled element and second profiled element together form a latching mechanism, by means of which a connection can be generated between the first profiled element and second profiled element, preferably by means of a form-fitting connection, wherein the connection, in particular the form-fitting connection, only acts in a width direction and height direction of the profiled plastic section, but not in a longitudinal direction of the profiled plastic section.

The first profiled element and second profiled element further overlap in their width direction if the connection has been generated between the first profiled element and second profiled element, in particular via a form-fitting connection, or if the profiled elements are interlocked. In particular, the overlap can encompass a large area, e.g., more than 25%, preferably more than 30%, especially preferably more than 40% of the entire width of the profiled plastic section, wherein the distances between the non-overlapping areas can each preferably measure 1.0 mm or more, especially preferably each 2.5 mm or more.

In addition, the connection, in particular the form-fitting connection, between the first and second profiled element can be established by moving the profiled elements, preferably via a first placement in the width direction, and then a latching through movement in a height direction of the profiled plastic section.

Furthermore, the connection, in particular the form-fitting connection, between the first profiled element and second profiled element is configured in such a way as to permit an independent and free movement of the first profiled element and second profiled element in a longitudinal direction of the interlocked profiled plastic section (shear-free connection in the longitudinal direction of the profiled plastic section) if a first metal component is connected with the first profiled element in preferably a shear-resistant or shear-soft manner, and if a second metal component is connected with the second profiled element in preferably a shear-resistant or shear-soft manner. In other words, none of the profiled elements viewed separately is provided and set up to be simultaneously connected in a shear-resistant or shear-soft manner with the first and second metal component. In this conjunction, "shear-soft" can be understood in particular to mean that the materials of the profiled plastic section in question and of the metal component can absorb a limited amount of shear forces, and that a connection between the mentioned elements can be established.

The first profiled element can form a first connecting strip in particular on a first longitudinal edge of the profiled plastic section, and the second profiled element can form a second connecting strip in particular on a second longitudinal edge of the profiled plastic section. The connecting strips can be used to introduce the assembled profiled plastic section into corresponding receptacles of profiled metal sections, for example, and hold them there in a shear-resistant manner through traction or a form-fitting connection. The connecting strips are usually inserted into matching grooves of the profiled metal sections, and mechanically connected via so-called curling. It is here important that the profiled elements, and hence also the inside and outside profiled metal sections, can continue to independently move relative to each other in the longitudinal direction of the profiled plastic section. In particular, the first and second connecting strips can have an integral design. The first profiled element and second profiled element are fixed in their relative position to each other in the width direction and height direction, in particular via the form-fitting connection.

A complete plastic/metal composite profiled section can be fabricated with two profiled plastic sections and two profiled metal sections or metal components. In this case, two profiled plastic sections according to the invention can also be used, as a result of which a total of four profiled plastic section elements are used. However, the invention can likewise be carried over to higher profiled sections (in the height direction), e.g., so as to thereby manufacture a profiled plastic section that comprises a first profiled element, a broadly configured second profiled element and a third profiled element.

The profile geometries can or must be adjusted for various applications. For this reason, there is a plurality of possible profile variants. In particular, wall thicknesses, connecting strips (curling projections), contour progressions and a use of functional zones like flags, hooks, lugs, grooves, T-shaped projections, channels, hollow chambers, offsets and the use of materials and material combinations along with manufacturing processes for influencing the product properties (e.g., fiber orientation, fiber length or porosity) can be selected based on the intended application and possible customer requirements.

In the assembled state, the profiled plastic section extends in a longitudinal direction, a width direction and a height direction. In other words, the profiled plastic section has a length (in the longitudinal direction), a width (in the width direction) and a height (in the height direction). The mentioned directions run perpendicular to each other within the meaning of a Cartesian coordinate system. In its assembled state, the profiled plastic section typically extends in its longitudinal direction significantly more than in its width direction and in its height direction. Because the profiled elements preferably overlap a large surface in the width direction and are fixed in place by the latching mechanism, possibly a hinge and sliding element and additional transverse webs, the cohesion and stability of the assembled profiled plastic section are especially high. As a consequence, transverse forces, in particular transverse tensile forces, which act on the assembled profiled plastic section in the width direction or parallel thereto can be absorbed to an especially high degree. Because the form-fitting connection allows movements or displacements between the profiled elements, shear stresses between the profiled metal sections can be broken down via the shear-free profiled plastic section, and any resultant, undesired deflections of the metal/plastic composites, which arise in the end product, e.g., in windows and doors, owing to the temperature differences described above, can be avoided.

An embodiment provides that the first profiled element and second profiled element together form a sliding arrangement for aligning the profiled elements relative to each other. The sliding arrangement permits a rough alignment of the profiled elements relative to each other, and a displacement of the profiled elements relative to each other in the longitudinal direction of the profiled plastic section. The rough alignment of the profiled elements relative to each other makes it especially easy to latch them together. For this purpose, the sliding arrangement can comprise a sliding lug and corresponding groove. In particular, the sliding lug and groove can be shaped one corresponding to the other in such a way that the sliding lug can be introduced into the groove in essentially the width direction. After the sliding lug has been introduced into the groove, the connection between the profiled elements can be established by means of the latching mechanism.

It can further be provided that the first profiled element and second profiled element together comprise a sliding arrangement in the form of a loose hinge or in the form of a loose joint, wherein the first profiled element and second profiled element can be rotated around a rotational axis of the loose hinge or loose joint in such a way that profiled elements are connected by means of the latching mechanism, in particular via a form-fitting connection, as a result of which the profiled plastic section is fixed in place, and an undesired disassembly is prevented. In particular, the longitudinal direction of the assembled profiled plastic section can run parallel to the rotational axis of the loose hinge or loose joint. The loose hinge or loose joint can be configured in such a way, in combination with one or several latching mechanisms or overlapping transverse webs, as to generate a form-fitting connection between the first profiled element and second profiled element in the width direction and in the height direction of the profiled element. In other words, the loose hinge or loose joint alone does not yet ensure any cohesion between the profiled elements, but above all facilitates their alignment when starting to assemble the profiled plastic section, and further facilitates the assembly of the profiled plastic section due to the ability to screw or curl the profiled elements into each other. However, the connection, in particular the form-fitting connection, between the profiled elements is established either via the latching mechanism (possibly in conjunction with optional transverse webs), or can be established by the latching mechanism and possibly additional transverse webs interacting with the loose hinge or loose joint, but not via the loose hinge or loose joint by itself.

The combination consisting of the latching mechanism, e.g., with a hook pair, and the sliding arrangement, e.g., in the form of a loose hinge or loose joint or with a sliding lug and with a groove, enables an especially simple and precise assembly of the two profiled elements into the profiled plastic section. Two-part profiled plastic sections are typically fabricated in large lengths, wherein the profiled elements can typically have lengths within a range of 6-7 m, for example. Putting together two profiled sections into a profiled plastic section with assembly processes known from prior art is associated with a high outlay in conjunction with a precise alignment and an introduction of mutually corresponding areas of the profiled elements. As a result of the sliding arrangement, the profiled plastic section in this embodiment makes it possible to align the profiled elements easily and precisely relative to each other. For example, the first profiled element can be a female element, e.g., a groove, and the second profiled element can be a male element corresponding to the female element, e.g., a sliding lug, of the sliding arrangement. The male element can be introduced into the female element, as a result of which the profiled elements are essentially aligned relative to each other as provided, and can subsequently be tilted or twisted relative to each other in such a way that the profiled elements are connected with each other by the latching mechanism at least in a form-fitting manner.

The sliding arrangement can further comprise a trough-shaped, groove-shaped or notch-shaped groove (as a female element) of the first profiled element, for example, and a sliding lug corresponding with the shape of the groove (as the male element) of the second profiled element. Alternatively, the second profiled element can also have the groove and the first profiled element can have the sliding lug. Further possible for the sliding lug is a plurality of square, tapered, rounded, thickened, constricted, straight, inclined and/or angled geometries. The sliding lug or similar element can function as a latching and centering aid, and in the first step can be introduced into the correspondingly deepened groove, as result of which the profiled elements are roughly aligned relative to each other as provided, and can subsequently be twisted, bent or tilted relative to each other in such a way that the profiled elements are connected with each other at least in a form-fitting manner by the latching mechanism. The profiled elements can here also be reversibly or elastically deformed in parts, so as to enable the latching.

In another embodiment, the latching mechanism has a first hook of the first profiled element, a second hook of the second profiled element, at least one first transverse web of the first profiled element and at least one second transverse web of the second profiled element, wherein the first hook and second hook are configured to intermesh, and wherein the first transverse web and second transverse web are configured to fix the first hook and second hook in their intermeshing position.

The hooks are here arranged relative to each other and spaced apart from the transverse webs in such a way that, in the assembled state of the profiled plastic section, the intermeshing hooks are held in their position relative to the width direction of the profiled plastic section in a form-fitting manner, so that the profiled element can absorb in particular normal forces in the assembled state. Furthermore, the transverse webs make it possible to prevent relative displacement movements of the profiled elements in the width direction. The transverse webs thus serve as a counter bearing to the hooks in the width direction of the profiled plastic section in its assembled state. Furthermore, the intermeshing hooks and the sliding element formed jointly by the profiled elements ensure that the intermeshing hooks remain held together in a form-fitting manner relative to the height direction of the profiled plastic section, wherein the height direction runs perpendicular to the width direction and perpendicular to the longitudinal direction of the profiled element, so that the profiled element can absorb in particular transverse forces in the width direction in the assembled state. In particular, the hooks can be arranged relative to each other and be spaced apart from the transverse webs in such a way that, in the assembled state of the profiled plastic section, the intermeshing hooks are jammed against each other, i.e., are also fixed in place by traction, thereby enabling an especially secure hold of the assembled profiled plastic section. Furthermore, the hooks and transverse webs can ensure that at least one cavity arises between the profiled elements in the assembled state of the profiled plastic section.

The first hook and second hook form a first interacting hook pair. The first transverse web and second transverse web form a second interacting transverse web pair. In particular, the hook pair and transverse web pair can protrude from a surface of the first profiled element or the second profiled element in such a way as to interact in the assembled state of the profiled plastic section. The hook pair and transverse web pair preferably run in the width direction spaced apart from each other and parallel to each other. Another transverse web pair (another first or a third transverse web and another second or a fourth transverse web) are especially preferably provided, which adjacently spaced apart from the first transverse web pair preferably runs in the width direction spaced apart from the first transverse web pair and parallel to the first transverse web pair. It is likewise preferred that the hooks and transverse webs each run along the entire first profiled element and the second profiled element relative to the longitudinal axis of the profiled elements, and thus along the entire profiled plastic section when in the assembled state.

Another embodiment provides that the first profiled element and second profiled element can be rotated around the rotational axis of the joint in such a way that the first hook touches the second hook, and the first transverse web touches the second transverse web, wherein the hooks and/or transverse webs elastically deform when the first profiled element and second profiled element are guided out of an initial tilted position into the final interlocked position for generating the form-fitting connection, so that the hooks intermesh and are fixed in this position by the transverse webs. This embodiment allows the transverse webs to tension the hooks in their intermeshing position in the assembled state of the profiled plastic section, and also ensures a traction and form-fitting connection between the first profiled element and second profiled element Furthermore, the hooks and/or transverse webs can be chamfered in such a way as to facilitate the form-fitting connection by tilting/turning the first profiled element and second profiled element during assembly.

Furthermore, the profiled plastic section can be box-shaped in the assembled state. In this conjunction, "box-shaped" can be understood in particular as meaning that the profiled elements together form at least one hollow chamber. The assembled profiled plastic section can essentially be cuboid, although this is not necessary. For example, the profiled plastic section can alternatively also have inclined side walls or an essentially trapezoidal cross section. Furthermore, the profiled plastic section need not be closed in its longitudinal direction. The box shape is already enabled on the one hand by the overlapping of the first profiled element and second profiled element, preferably over a large surface. For example, the first profiled element can further have an essentially L-shaped cross section, and the second profiled element can have an elbowed design. Its box-shaped structure gives the profiled plastic section an especially high stiffness and stability. The box structure is enhanced even further if a profiled element has not just one, but several connecting strips that only engage into a metal component. The box-shaped configuration is likewise strengthened by constructing the profiled plastic section out of more than just two profiled elements, with each of the profiled elements then having at least one connecting strip.

Another embodiment provides that the first profiled element and second profiled element form at least one hollow chamber. In particular, the at least one hollow chamber can arise between the hook pair and transverse pair in the assembled state of the profiled plastic section. Furthermore, this allows hollow chambers to come about between the first hook pair and contacting end sections of the profiled elements as well as between the (additional) transverse web pair and the joint in the assembled state of the profiled plastic section. Likewise, a hollow chamber can arise between the transverse web pair and additional transverse web pair in the assembled state of the profiled plastic section.

While the term transverse web pair does imply that only two transverse webs correspond, applications can also be described in which three or more transverse webs correspond, wherein this plurality of transverse webs then also satisfies the function of interlocking in the width direction.

In another embodiment, a profiled element can in itself already be integrally designed with one or more hollow chambers.

Before assembling the profiled elements into the profiled plastic section, accessible areas between the profiled elements can have introduced into them insulating means, e.g., insulating foam, in particular comprised of meso- or macroporous, closed- or open-celled materials, e.g., aerogel, polyurethane-, polyester-, polyolefin-, polyamide foams or foamed vinyl polymers. Alternatively or additionally, corresponding inner surfaces of the profiled elements, above all the transverse webs, can be provided with a coating or a film having an especially low emissivity $\varepsilon$. As a result, the heat transfer via thermal radiation within the profiled plastic section can be significantly reduced. In addition, the arising hollow chambers divide a larger cavity located between the profiled elements into several small hollow chambers. By comparison to the larger cavity between the profiled elements, the advantage to the several smaller hollow chambers is that a convection inside of the hollow chambers can be kept especially low. The size and arrangement of the individual hollow chambers, and hence the convection within the hollow chambers, can be easily and flexibly influenced by the arrangement of the hooks and transverse webs. Neither the hooks nor the transverse webs must here be situated in a geometric center between the longitudinal edges of the respective profiled elements.

Functional zones (flags, hooks, channels, etc.) optimized for the application can likewise be set up on the exterior sides of the profiled plastic section; the latter are frequently described and used in prior art.

Another embodiment advantageously provides that the first profiled element and second profiled element comprise a plurality of profiled projections, which have mutually corresponding contours with a saw tooth or zigzag shaped progression, hook elements, mushroom or ball elements for fastening the profiled elements with each other in the height direction and/or width direction. This embodiment permits an especially secure cohesion of the profiled elements with each other in the height direction of the profiled plastic section. Such profiled sections represent an extreme case according to the invention, in which the plurality of projections assume the functions of latching elements, transverse webs and sliding elements, or at least support these elements in their function.

Furthermore, the hooks can have an undercut design, so that they can hook into each other especially fixedly, and an especially secure cohesion can be ensured between the first profiled element and second profiled element in the height direction of the profiled plastic section.

Another embodiment provides that the first profiled element and/or second profiled element each taken by itself from at least one additional hollow chamber, making it possible to further improve the thermal properties of the profiled plastic section.

Another embodiment provides that at least one of the transverse webs be at least partially provided with an infrared-reflecting coating. The coating preferably comprises a metallized film or a metallized foam strip. The use of an aluminum-containing film is especially preferred. Such coatings permit an especially low level of emissivity $\varepsilon$.

In addition, it can advantageously be provided that the profiled plastic section further comprise at least one third profiled element, which is configured to be fixedly connected with a metal component, wherein the second profiled element is connected with the first profiled element and with the third profiled element in a shear-free manner in the longitudinal direction of the profiled plastic section. For example, the second profiled element can be arranged between the first profiled element and third profiled element, wherein the three profiled elements can each be separately connected with a profiled metal section in a shear-resistant manner. The second profiled element can here be connected in a shear-free manner with the first profiled element and with the third profiled element in the longitudinal direction of the profiled plastic section, i.e., the second profiled element can be moved in the longitudinal direction of the profiled plastic section relative to the first profiled element and relative to the third profiled element if the three profiled elements in themselves are connected with the profiled metal sections in a shear-resistant manner viewed in the longitudinal direction. Providing three or more profiled elements enables an especially high configuration of the profiled section in the height direction, wherein the assembled profiled plastic section can assume the function of two individual profiled plastic sections in a plastic/metal composite profiled section, and permits additional static advantages due to optional braces. For example, a second profiled element arranged between the first profiled element and second profiled element can have two connecting strips, and the other two profiled elements can each have a connecting strip. The profiled plastic section according to this embodiment is easier to handle than two individual profiled plastic sections. Likewise, the profiled section statics are advantageous for mechanically demanding final applications.

In a second aspect of the invention, a metal/plastic composite profiled section comprises a profiled plastic section described in conjunction with the first aspect of the invention, a first metal component and a second metal component, wherein the first metal component is preferably connected in a shear-resistant manner with the first profiled element, and wherein the second metal component is preferably connected in a shear-resistant manner with the second profiled element. To avoid repetition, reference will be made to the statements in conjunction with the profiled plastic section according to the first aspect of the invention with respect to advantageous embodiments, effects and advantages of the metal/plastic composite profiled section. Additional profiled elements can likewise be present, which are connected with other profiled elements in a shear-free manner to yield a box-shaped profiled plastic section, and are each connected with one of the two metal components in a shear-resistant manner.

In a third aspect of the invention, a frame for a window, door or a façade element comprises a metal/plastic composite profiled section according to the second aspect of the invention.

BRIEF DESCRIPTION OF THE FIGURES

Exemplary embodiments of the invention will be explained in more detail below based on the schematic drawing. Shown here on:

FIG. 19*a* is a side view of another exemplary embodiment of a profiled plastic section according to the invention with variable wall thicknesses and a strip-shaped sliding element with groove in the first profiled element, wherein two profiled elements of the profiled plastic section are depicted separate from each other, FIG. 19*b* is the profiled plastic section according to FIG. 19*a* in the assembled state, FIG. 20*a* is a side view of another exemplary embodiment of a profiled plastic section according to the invention with variable wall thicknesses and a self-centering sliding element with groove in the second profiled element, wherein two profiled elements of the profiled plastic section are depicted separate from each other, FIG. 20*b* is the profiled plastic section according to FIG. 20*a* in the assembled state, FIG. 23*a* is a side view of another exemplary embodiment of a symmetrical profiled plastic section according to the invention with a total of three connecting strips in a separated state, FIG. 23*b* is the profiled plastic section according to FIG. 23*a* in the assembled state, FIG. 24 is a scheme for calculating an overlap between two profiled elements based on an exemplary embodiment of a profiled plastic section according to the invention with two connecting strips.

DETAILED DESCRIPTION OF EXEMPLARY EMBODIMENTS

Figure 1:
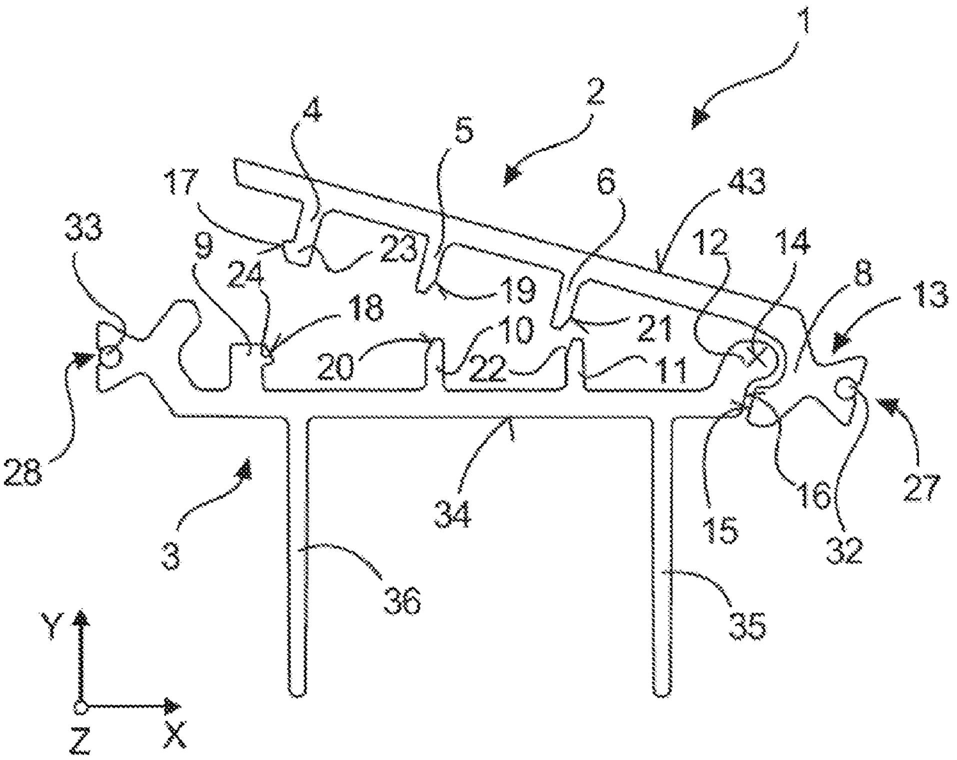
FIG. 1 is a side view of an exemplary embodiment of a profiled plastic section during a first step of assembling a profiled plastic section.

FIG. 1 shows a profiled plastic section 1, which comprises a first profiled element 2 depicted above on FIG. 1, and a second profiled element 3 depicted below on FIG. 1. The profiled elements 2, 3 have an oblong shape overall, i.e., they extend significantly more in their longitudinal direction z (which on FIGS. 1 to 4 runs perpendicular to the drawing plane) or depth, usually by a multiple, than in their width x and in their height y. In order to describe the geometry of the profiled plastic section 1, reference will be made below to a Cartesian coordinate system, which consists of a width axis x, a height axis y and a longitudinal axis z, wherein the axes x, y and z are each perpendicular to each other, the width axis x and height axis y lie in the drawing plane, and the longitudinal axis z runs perpendicular to the drawing plane.

The first profiled element 2 comprises a first hook 4, a first transverse web 5, a second transverse web 6 along with a groove 8, a trough-shaped groove 8 in the exemplary embodiment shown. The second profiled element 2 comprises a second hook 9, a third transverse web 10, a fourth transverse web 11 along with a sliding lug 12, a rounded sliding lug 12 in the exemplary embodiment shown. The hooks 4, 9 and transverse webs 5, 6 and 10, 11 stick out perpendicularly from facing inner surfaces of the profiled elements 2, 3, and essentially run parallel to the height axis y when the profiled plastic section 1 is assembled.

For example, the profiled plastic section 1 or its profiled elements 2, 3 can be made out of the material "TECATHERM®66 GF" of the applicant, a plastic that is based on a black polyamide and comprises 25% w/w glass fibers. This material is characterized in particular by its good suitability for the intended application. It is further perfectly suitable for manufacturing hollow chamber profiled sections with thin walls, for powder coatings and anodizing in a composite.

The groove 8 and sliding lug 12 together comprise a sliding arrangement in the form of a loose hinge or a loose swivel joint 13 with a rotational axis 14. As depicted on FIGS. 1 to 4, the first profiled element 2 and second profiled element 3 can be turned or tilted relative to each other around the rotational axis 14 of the swivel joint 13. In the exemplary embodiment shown, the rotational axis 14 runs parallel to the longitudinal axis z. An angular range by which the first profiled element 2 and second profiled element 3 can here be turned relative to each other is limited, wherein FIG. 1 depicts a maximally open twisting or tilting position of the profiled elements 2, 3 relative to each other, while FIGS. 3 and 4 depict a maximally closed twisting position of the profiled elements 2 relative to each other.

In the twisting position of the profiled elements 2, 3 relative to each other shown on FIG. 1, a first stop surface 15 of the groove 8 abuts against a corresponding second stop surface 16 of the second profiled element 3. In this position, the first profiled element 2 and second profiled element 3 form an acute angle relative to each other, wherein the first hook 4 does not touch the second hook 9, the first transverse web 5 does not touch the second transverse web 10, and the third transverse web 6 does not touch the fourth transverse web 11.

Figure 2:
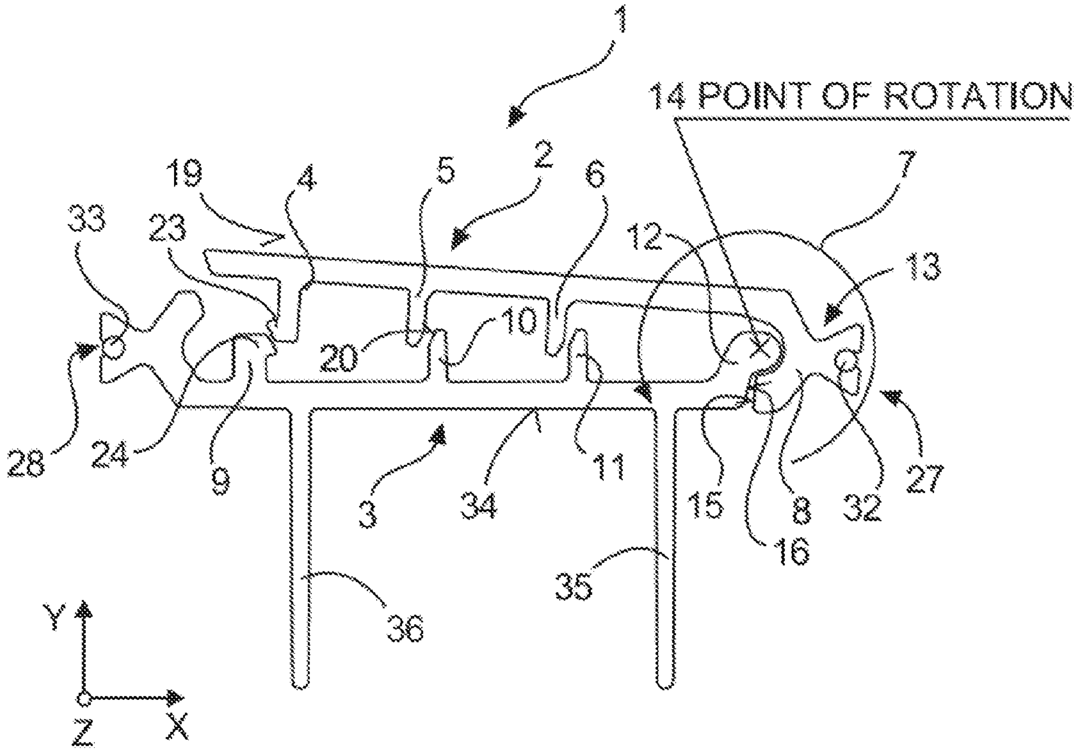
FIG. 2 is a side view of the profiled plastic section according to FIG. 1 during a second assembly step.

FIG. 2 shows the first profiled element 2 and second profiled element 3 in another twisting position relative to each other, wherein the first hook 4 touches the second hook 9, the first transverse web 5 touches the second transverse web 10, and the third transverse web 6 touches the fourth transverse web 11. The position of the profiled elements 2, 3 relative to each other shown on FIG. 2 was achieved by twisting the profiled elements 2, 3 around the rotational axis 14 out of the relative position depicted on FIG. 1 toward each other. In this case, the first profiled element 2 can be twisted counterclockwise in relation to the illustration on FIGS. 1 to 4 (spinning arrow 7, FIG. 2), and/or the second profiled element 3 can be twisted clockwise in relation to the illustration on FIGS. 1 to 4.

Figure 3:
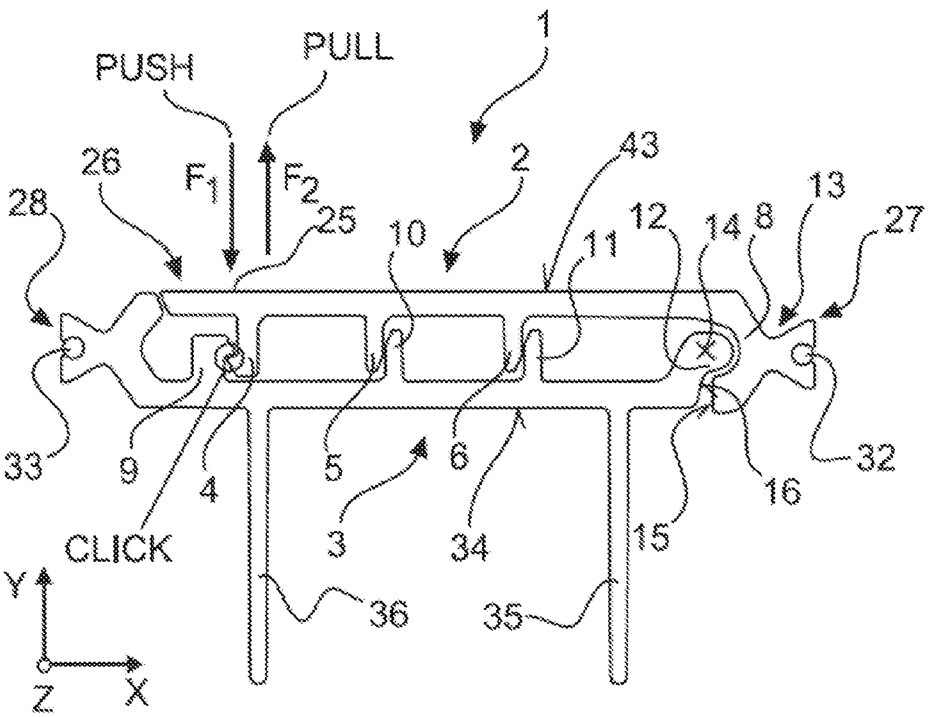
FIG. 3 is a side view of the profiled plastic section according to FIG. 1 during a third assembly step.
Figure 4:
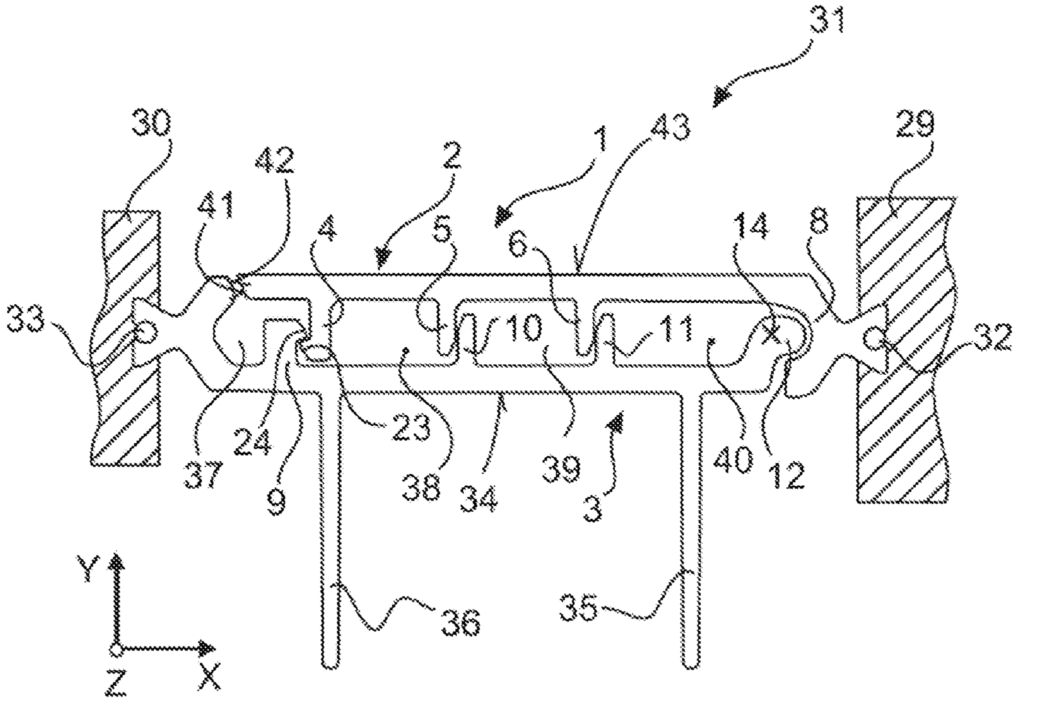
FIG. 4 is a side view of the profiled plastic section according to FIG. 1 during a fourth assembly step.

As evident from FIGS. 1 to 4, the hooks 4, 9 and transverse webs 5, 10 and 6, 11 each have a chamfer. The chamfers are arranged and oriented in such a way as to touch each other in the rotational position of the first profiled element 2 and second profiled element 3 relative to each other depicted on FIG. 2. When the profiled elements 2, 3 are further twisted relative to each other, the chamfers act as a guide, so as to connect the first profiled element 2 with the second profiled element 3 via a form-fitting connection (FIGS. 3 and 4). For illustrative purposes, each of the chamfers is provided with a reference number 17 to 22 on FIG. 1, wherein in the position depicted on FIG. 2, a first chamfer 17 of the first hook 4 abuts against a second chamfer 18 of the second hook 9, a third chamfer 19 of the first transverse web 5 abuts against a fourth chamfer 20 of the second transverse web 10, and wherein a fifth chamfer 21 of the third transverse web 6 abuts against a sixth chamfer 22 of the fourth transverse web 11.

FIG. 3 shows the profiled elements 2, 3 in a third twisting position relative to each other, wherein the first hook 4 is latched into the second hook 9. Proceeding from the position shown on FIG. 2, the profiled elements 2, 3 were twisted further around the rotational axis 14 relative to each other, so that a first hook head 23 of the first hook 4 and a second hook head 24 of the second hook 9 have moved past each other exposed to an elastic deformation. The hook head 23 of the first hook 4 points to the left according to FIGS. 3 and 4, and the hook head 24 of the second hook 9 points to the right according to FIGS. 3 and 4. Similarly, the first transverse web 5 and second transverse web 10 along with the third transverse web 6 and fourth transverse web 11 have moved past each other a bit while exposed to an elastic deformation, and now abut against each other over a large surface, as shown on FIGS. 3 and 4. The transverse webs 5, 10 and 6, 11 here span the hooks 4, 9 in their intermeshing position, and ensure a tractive connection and a form-fitting connection between the first profiled element 2 and second profiled element 3.

The form-fitting connection produced by the hooks 4, 9 and transverse webs 6, 10 and 6, 11 acts parallel to the width axis x, and allows the assembled profiled plastic section 1 to be able to absorb tensile and compressive forces parallel to the width axis x. Furthermore, the hooks 4, 9 and the pivot joint 13 or its groove 8 and sliding lug 12 produce another form-fitting connection, which acts parallel to the height direction y, and allows the assembled profiled plastic section 1 to be able to absorb tensile and compressive forces parallel to the height axis y.

The tractive connection generated by the hooks 4, 9 and transverse webs 5, 10 and 6, 11 is produced by spacing the hooks 4, 9 and transverse webs 5, 10 apart from each other—in "undersized" fashion, so to speak—in the assembled state of the profiled plastic section 1 in such a way that they tension each other. In other words, the transverse webs 5, 10 serve as a tensioning counter bearing for the hooks 4, 9 and vice versa. In particular, the tractive connection acts parallel to the height axis y as a frictional connection, so that the profiled elements 2, 3 are impeded from once again moving out of their twisting position relative to each other shown on FIGS. 3 and 4.

In order to generate the elastic deformation of hooks 4, 9 and transverse webs 5, 6 and 10, 11, an elevated expenditure of force or an elevated torque is required, for example which can be provided by exerting a compressive force $F_1$, e.g., which acts perpendicular to an outer surface 43 of the first profiled element 2 and, according to FIG. 3, roughly parallel to the height axis y, on the first profiled element 2 at position 25, wherein the second profiled element 3 is immobile or held in place, and thus serves as a counter bearing for the first profiled element 2. Position 25 is located in an end area 26 of the first profiled element 2 lying opposite the groove 8, which results in the formation of an especially long lever arm, which can provide an especially high torque for generating the elastic deformation of the hooks 4, 9 and transverse webs 5, 10 and 6, 11.

In the position shown on FIGS. 3 and 4, the first profiled element 2 and second profiled element 3 are thus joined together via a form-fitting connection. As a consequence, the profiled plastic section 1 is assembled. In particular, the form-fitting connection can be detachable or reversible in design, i.e., the first profiled element 2 and second profiled element 3 can be nondestructively detached from each other again. This can be done by separating the hooks 4 and 9 from each other, e.g., by now exerting a tensile force $F_2$ instead of a compressive force on the first profiled element 2 at position 23, wherein the second profiled element 3 is immobile or held in place, and thus serves as a counter bearing. The tensile force $F_2$ allows the hook heads 23, 24 and transverse webs 5, 10 and 6, 11 to move past each other while exposed to elastic deformation, and to be brought back into the position shown on FIGS. 1 and 2. Furthermore, the profiled elements 2 and 3 can also be moved in opposite directions relative to the longitudinal axis z, so that they are pulled apart in the longitudinal direction z.

Furthermore, the first profiled element 2 forms a first one-part connecting strip 27 on its longitudinal edge shown on the right of FIGS. 1 to 4, and the second profiled element 3 forms a second one-part connecting strip 28 on its longitudinal edge shown on the left of FIGS. 1 to 4. The one-part connecting strips 27, 28 can be used to introduce the assembled profiled plastic sections 1 into corresponding receptacles of profiled metal sections 29, 30 (FIG. 4), e.g., comprised of aluminum, and there be held in a shear-resistant manner, e.g., by means of a frictional, tractive or form-fitting connection. In this conjunction, FIG. 4 shows a first metal component in the form of a first profiled metal section 29 (on the left), and a second metal component in the form of a second profiled metal section 30 (on the right). The corresponding receptacles of the profiled metal sections 29, 30 correspond with the essentially trapezoidal cross sections of the connecting strips 27, 28. The first profiled metal section 29 is connected with the first profiled element 2 of the profiled plastic section 1 in a shear-resistant manner, and the second metal component 30 is connected with the second profiled element 3 of the profiled plastic section 1 in a shear-resistant manner, thereby forming a metal/plastic composite profiled section 31. The metal/plastic composite profiled section 31 can be a constituent of a frame (not shown) for a window, a door or a façade element.

In the exemplary embodiment shown on FIGS. 1 to 4, the connecting strips 27, 28 have optional frontal recesses, into which sealing wires 32, 33 are inserted. The shear resistance of the composite between the profiled plastic section 1 and profiled metal sections 29, 30 can thus be additionally ensured by activating the sealing wires 32, 33. For example, an activation temperature or melting point of the sealing wires 32, 33 can lie with a range of approx. 95° to 100° C. Furthermore, the surface 34 of the second profiled element 3 facing away from the first profiled element 2 has two parallel running and spaced apart flags 35, 36, which in particular contribute to reducing convective heat transfers within the metal/plastic composite profiled section 31.

In the position shown on FIGS. 3 and 4, the first profiled element 2 and second profiled element 3 overlap over a large area. The first profiled element 2 has an essentially L-shaped cross section, and the second profiled element 3 has an elbowed design. The geometries and dimensions of the profiled elements 2, 3 are here tailored to each other in such a way that the profiled plastic section 1 essentially has a box shape with several hollow chambers 37 to 40 in an assembled state. The "box" is closed at a first end relative to the width axis x by the groove 8 and sliding lug 12. At a second end lying opposite the first end relative to the width axis x, the box is closed by a first contact surface 41 of the first profiled element 2 and a second contact surface 42 of the second profiled element 3 corresponding to the first contact surface 41.

The box-shaped structure of the profiled plastic section 2 gives it a high stiffness and stability. Furthermore, insulating foams can be introduced into the hollow chambers 37 to 40, so as to enable an especially low heat transition coefficient $U_r$ of the metal/plastic composite profiled section 31. As an alternative to introducing insulating foams, an infrared radiation-reflecting, so-called "low-E film" can be applied to the side walls of the transverse webs or hook elements in particular in the area of the hollow chambers 37 to 40, e.g., an "Insulbar® LEF" film of the applicant, wherein "low-e" stands for an especially low degree of emissivity ε.

As a result of the form-fitting connection between the first profiled element 2 and second profiled element 3, the profiled elements 2, 3 cannot be moved relative to each other parallel to the width axis x and parallel to the height axis y. In particular forces acting parallel to the width axis x on the first profiled element 2 and second profiled element 3 can thus be absorbed to an especially high extent by the profiled plastic section 1. The cohesion of the profiled plastic section 1 is further increased and its stability elevated by virtue of the fact that the profiled elements overlap over a large-surface, are hooked together by the hooks 4, 9 and tensioned by the transverse webs 5, 10 and 6, 11. As a consequence, in particular even forces acting parallel to the height taxis y on the first profiled element 2 and the second profiled element 3 can be absorbed to an especially high extent by the profiled plastic section 1.

By contrast, the profiled elements 2, 3 can move parallel to the longitudinal axis z relative to each other. In particular, the contact surfaces 41, 42, hooks 4, 9, transverse webs 5, 10 and 6, 11 and groove 8 and sliding lug 12 of the profiled elements 2, 3 can slide parallel to the longitudinal axis along each other. As a result, a relative movement of the profiled elements 2, 3 in the longitudinal direction can offset various longitudinal expansions of the first profiled element 2 and second profiled element 3 or longitudinal expansions of the profiled metal sections 29, 30 connected with the profiled elements 2, 3 in a shear-resistant manner.

Figure 5:
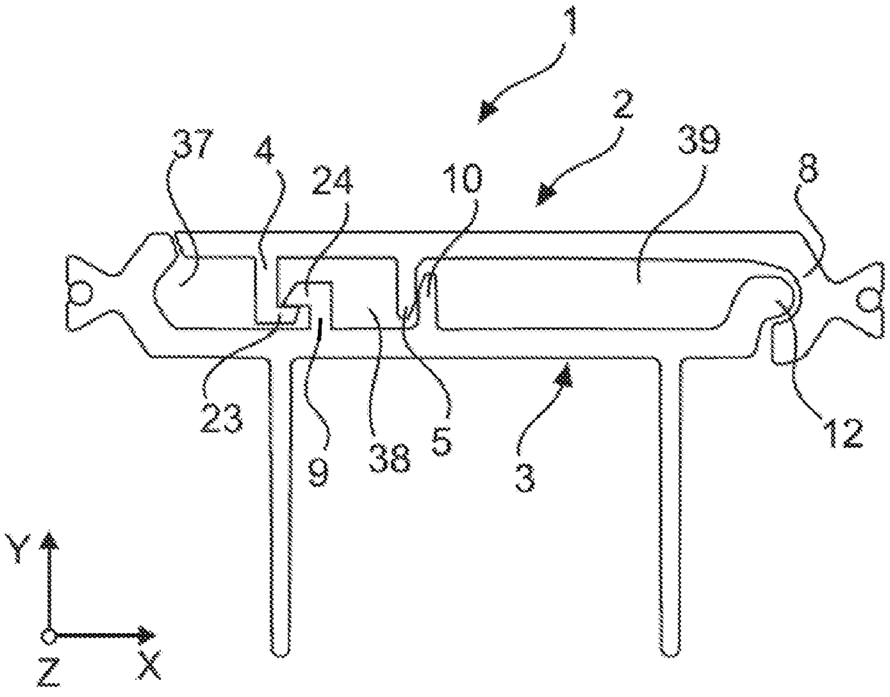
FIG. 5 is a side view of another exemplary embodiment of a profiled plastic section in an assembled state with an alternative hook orientation.
Figure 6:
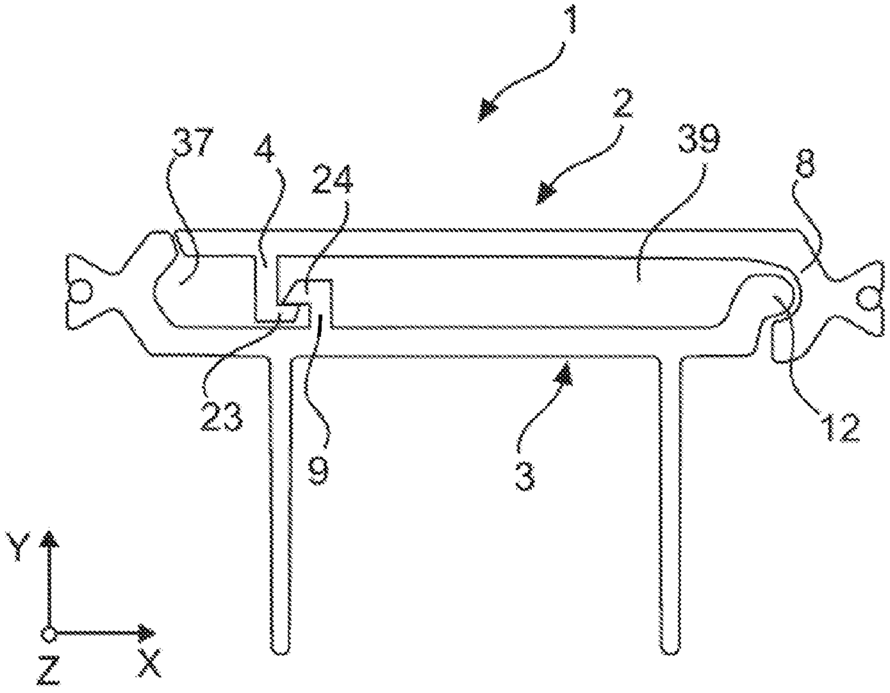
FIG. 6 is a side view of the profiled plastic section according to FIG. 5 without transverse webs.

FIGS. 5 and 6 each show another profiled plastic section 1, which is similar to the profiled plastic section 1 according to FIGS. 1 to 4, and differs with respect to the configuration of the hooks 4, 9 and transverse webs 5, 10. To avoid repetition, only the differences from the exemplary embodiment according to FIGS. 1 to 4 will be discussed below. The profiled plastic section 1 according to FIG. 5 has only two transverse webs 5, 10 instead of four transverse webs—as shown on FIGS. 1 to 4. The hooks 4, 9 are here arranged on the same side as depicted on FIGS. 1 to 4, but can be thicker in design, so as to enable an optimized transverse force transmission. The first hook head 23 of the first hook 4 points to the right according to FIG. 5, and the second hook head 24 of the second hook 9 points to the left according to FIG. 5. Due to the arrangement of the hook heads 23 and 24, the first hook 4, second hook 9, groove 8 and joint pin 12 can be used to produce a form-fitting connection between the first profiled element 2 and second profiled element 3, which acts parallel to the width axis x and parallel to the height axis y, as described in conjunction with FIGS. 1 to 4. Alternatively, a way to establish a linear connection between the profiled elements 2 and 3 can further be provided in place of the groove 8 and joint pin 12.

As described in conjunction with FIGS. 1 to 4, the transverse webs 5, 10 produce a tractive connection between the first profiled element 2 and second profiled element 3. Only the hooks 4, 9 and joint 13 are required to ensure a reliable cohesion of the profiled element 1 or its first profiled element 2 and second profiled element 3.

As depicted on FIG. 6, the transverse webs 5, 10 can be omitted for generating the form-fitting connection. By omitting the transverse webs 6, 11 (see FIGS. 1 to 4), only three hollow chambers 37, 38 and 39 are formed (FIG. 5) instead of four hollow chambers 37 to 40 in the assembled state of the profiled plastic section 1. By further omitting the transverse webs 5, 10 (see FIGS. 1 to 4), only two hollow chambers 37, 39 are formed (FIG. 6) instead of four hollow chambers 37 to 40 in the assembled state of the profiled plastic section 1.

FIGS. 7 to 10 show another profiled plastic section 1 for a metal/plastic composite profiled section. The profiled plastic section 1 comprises a first profiled element 2 and a second profiled element 3, wherein the first profiled element 2 and second profiled element 3 together form a latching mechanism 44 (see in particular FIGS. 8 to 10), which can be used to produce a form-fitting connection between the first profiled element 2 and second profiled element 3. The first profiled element 2 and second profiled element 3 overlap over a large surface in their width direction x if the form-fitting connection has been produced between the firs profiled element 2 and second profiled element 3 as depicted on FIG. 7, wherein the form-fitting connection between the first profiled element 2 and second profiled element 3 can be produced by moving the profiled elements 2, 3 in a height direction y of the profiled plastic section 1. The form-fitting connection between the first profiled element 2 and second profiled element 3 is here configured in such a way as to permit a movement by the first profiled element 2 and second profiled element 3 in a longitudinal direction z of the profiled plastic section 1 if a first metal component (see FIG. 4) has been connected with the first profiled element 2 in a shear-resistant manner, and a second metal component (see FIG. 4) has been connected with the second profiled element 3 in a shear-resistant manner.

Figure 7:
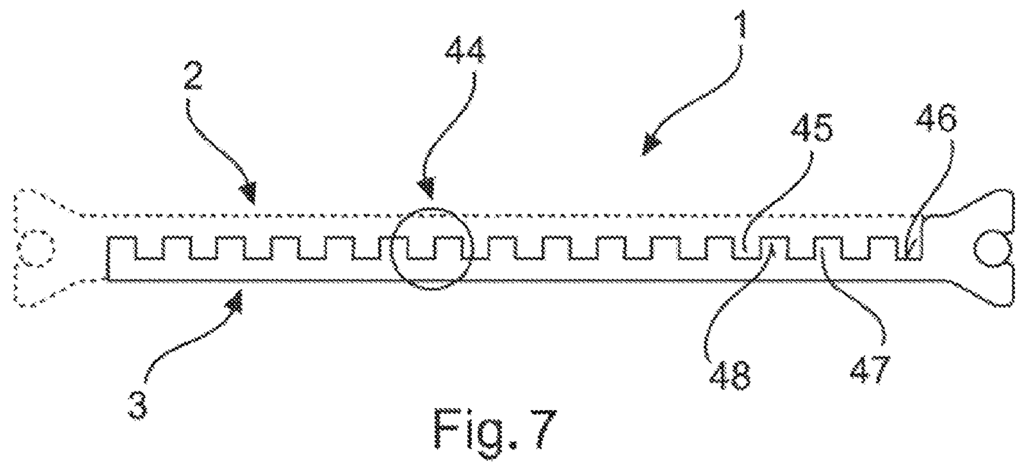
FIG. 7 is a side view of another exemplary embodiment of a profiled plastic section with a plurality of mutually interlocking transverse webs in the assembled state.

FIG. 7 shows that the profiled elements 2, 3 each have a mutually corresponding cross section for their connection, the progression of which in the width direction x equates to a square wave voltage. A plurality of identical projections 45 of the first profiled element 2 that run parallel to each other and are spaced apart from each other here engage into corresponding recesses 46 of the second profiled element 3, and a plurality of identical projections 47 of the second profiled element 3 that run parallel relative to each other and are spaced apart from each other engage into corresponding recesses 48 of the first profiled element 2.

Figure 8:
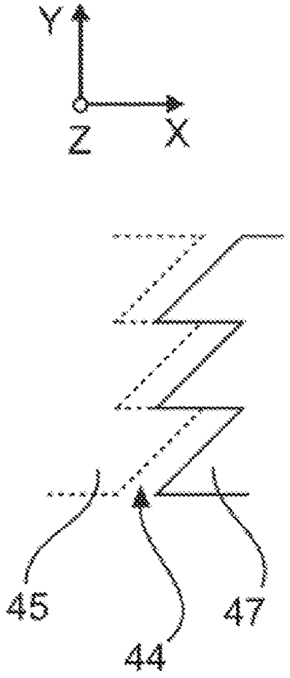
FIG. 8 is a first detailed variant of the profiled plastic section according to FIG. 7.

FIG. 8 shows that flanks of the projections 45/47 of the first/second profiled element 2/3 that run in the height direction y can each have a contour resembling a pine cone with a zigzag progression. The contours are shaped and oriented relative to each other in such a way that the projections 45 and 47 can hook into each other, thereby enabling an especially secure hold of the profiled elements 2, 3 with each other in the height direction y.

Figure 9:
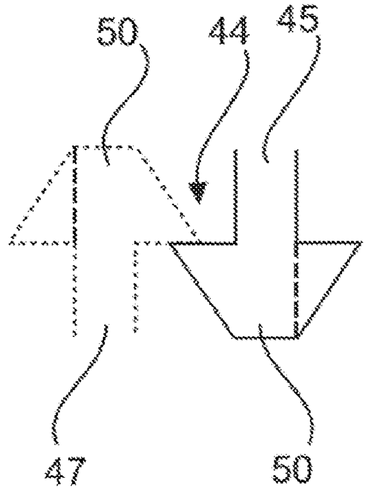
FIG. 9 is a second detailed variant of the profiled plastic section according to FIG. 7.

FIG. 9 shows that a respective hook element 50 resembling an arrow tip can be formed at the ends of the projections 45/47 of the first/second profiled element 2/3 that are distal relative to the height direction y. The hook elements 50 are shaped or oriented relative to each other in such a way that the projections 45 and 47 can hook into each other, thereby enabling an especially secure hold of the profiled elements 2, 3 with each other in the height direction y.

Figure 10:
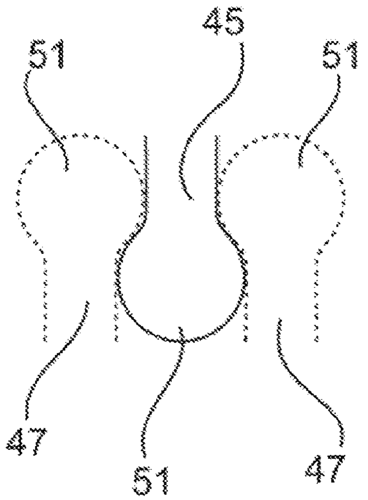
FIG. 10 is a third detailed variant of the profiled plastic section according to FIG. 7.

FIG. 10 shows that a respective ball element 51 can be formed at the ends of the projections 45/47 of the first/second profiled element 2/3 that are distal relative to the height direction y. The ball elements 51 are shaped or oriented relative to each other in such a way that the projections 45 and 47 can hook into each other, thereby enabling an especially secure hold of the profiled elements 2, 3 with each other in the height direction y.

Figure 11:
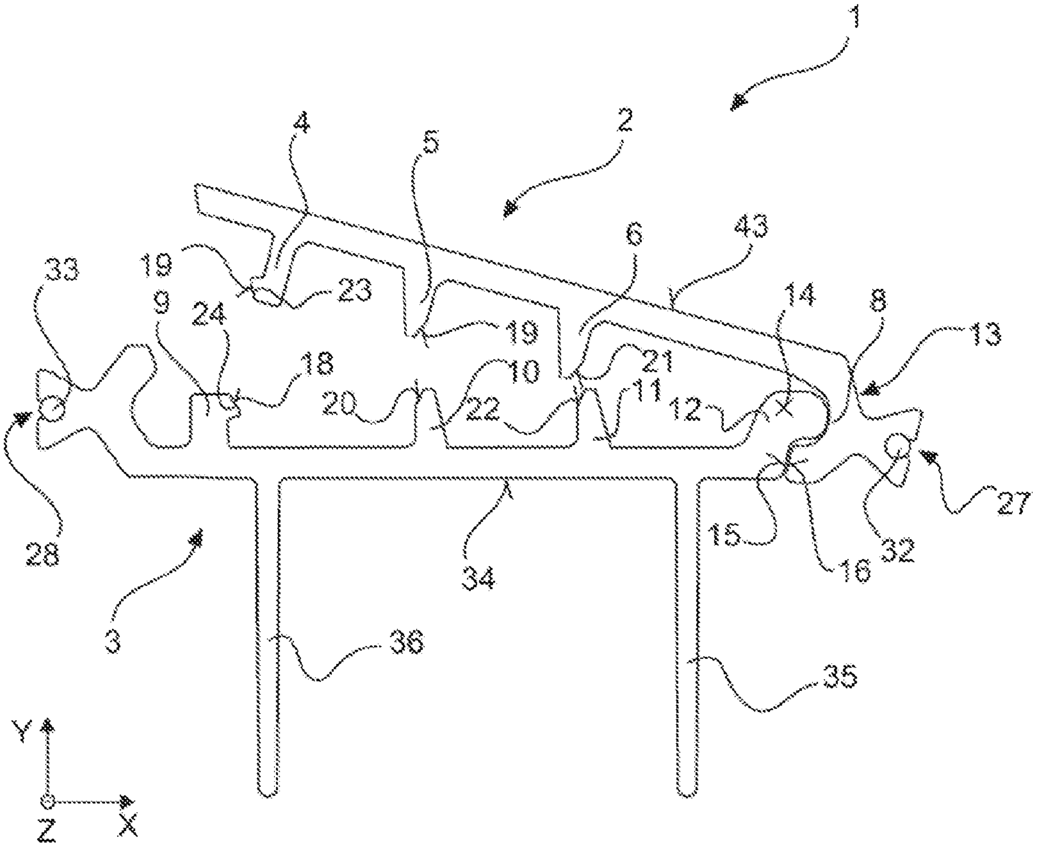
FIG. 11 is a side view of another exemplary embodiment of a profiled plastic section with rearward-reinforced transverse webs during a first step in assembling the profiled plastic section.

FIG. 11 shows another profiled plastic section 1 that is very similar to the profiled plastic section 1 according to FIG. 1, and is characterized by its rearward-reinforced areas of the transverse webs 5, 10 and 6, 11. In this conjunction, "rearward" is to be understood as the respective side of the transverse webs 5 and 6 that does not come into contact with a respective opposing transverse web 6 and 11 and vice versa. The surfaces of the transverse webs 5, 10 and 6, 11 that do come into contact with each other can further have a surface contour as illustrated and described in conjunction with FIG. 8, wherein a surface structure can have an especially fine configuration. This makes it possible to achieve an especially strong cohesion for the profiled elements 2 and 3 in the height direction y of the profiled plastic section.

Figure 12:
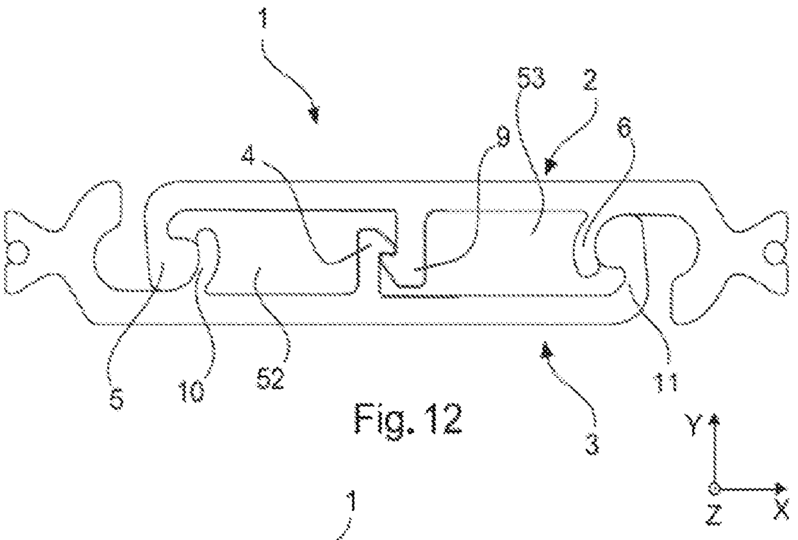
FIG. 12 is a side view of another exemplary embodiment of a profiled plastic section with undercut hook in an assembled state of the profiled plastic section.
Figure 13:
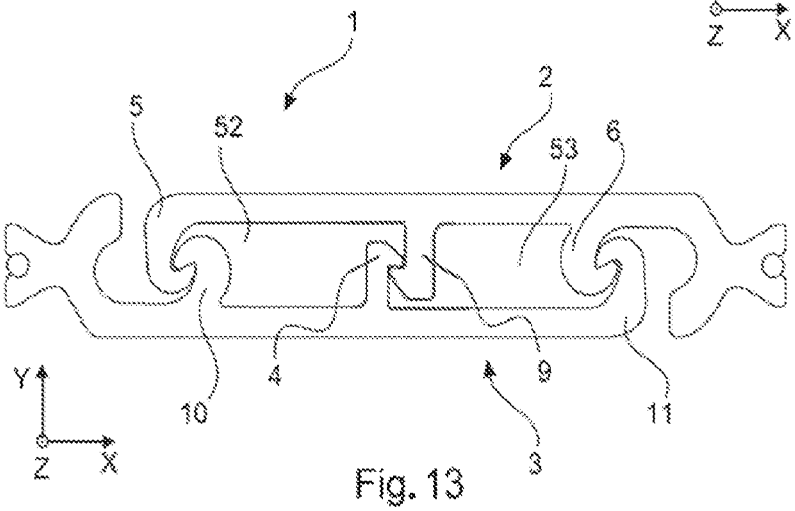
FIG. 13 is a side view of another exemplary embodiment of a profiled plastic section with undercut hook in an assembled state of the profiled plastic section.
Figure 14:
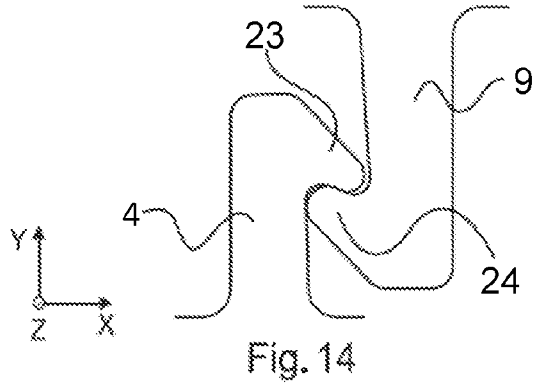
FIG. 14 is a magnified view of detail A from FIGS. 12 and 13.

FIGS. 12 and 13 show additional profiled plastic sections 1, which are similar to the profiled plastic section 1 according to FIG. 1. However, the exemplary embodiments according to FIGS. 12 and 13 have bifunctional latching and sliding elements, which consist of several hook-like elements or transverse webs 5, 10, 6 and 11. The latter are additionally secured by a hook pair 4, 9. According to the exemplary embodiments on FIGS. 12 and 13, the respective first hook head 23 of the first hook 4 is oriented toward the right, and the second hook head 24 of the second hook 9 is oriented toward the left. As evident from FIG. 14, the hook heads 23 and 24 of the hooks 4, 9 can have an undercut design. The undercut allows an especially strong intermeshing of hook heads 23 and 24, and thus an especially strong cohesion for the profiled elements 2 and 3 in the height direction y of the assembled profiled plastic section 1. The transverse webs 5, 10 and 6, 11 envelop the hooks 4, 9 on either side, and are shaped and arranged relative to each other in such a way as to fix the hooks 4, 9 into their reciprocally hooked position shown on FIGS. 12 and 13, and counteract any drifting apart of the profiled elements 2 and 3 in the height direction y.

Figure 15:
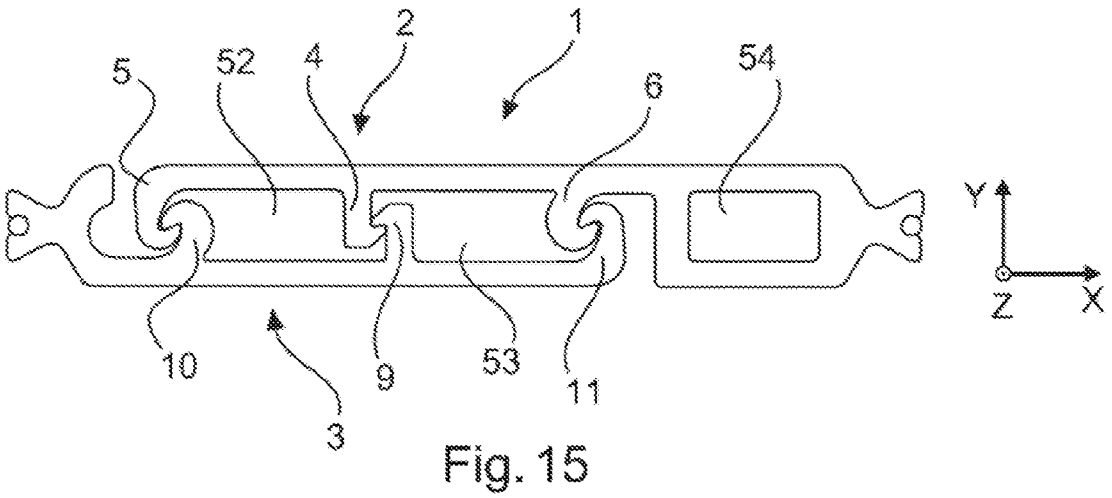
FIG. 15 is a side view of the profiled plastic section according to FIG. 13 with three hollow chambers.
Figure 16:
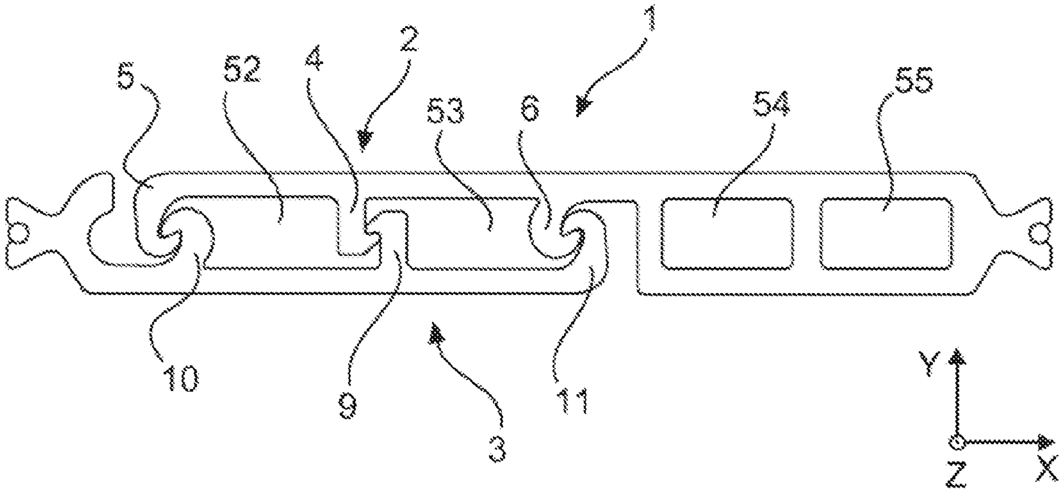
FIG. 16 is a side view of the profiled plastic section according to FIG. 13 with four hollow chambers.

In the exemplary embodiments according to FIGS. 12 and 13, a first hollow chamber 52 is formed between the transverse webs 5, 10 and hooks 4, 9, and a second hollow chamber 53 is formed between the hooks 4, 9 and transverse webs 6, 11. This is also the case in the exemplary embodiments of profiled plastic sections 1 according to FIGS. 15 and 16, which each are similar to the exemplary embodiment according to FIG. 13. The exemplary embodiments according to FIGS. 15 and 16 are characterized in that the first profiled element 2 forms an additional hollow chamber 54 (FIG. 15) or two additional hollow chambers 54 and 55 (FIG. 16) in an end area of the profiled plastic section 1 shown on the right of FIGS. 15 and 16. The hooks 4, 9 according to FIGS. 15 and 16 can also be undercut in design, as also illustrated on FIG. 14. Alternatively, the hooks 4, 9 shown on FIGS. 15 and 16 or their hook ends can also be oriented as depicted on FIGS. 12 to 14.

Figure 17:
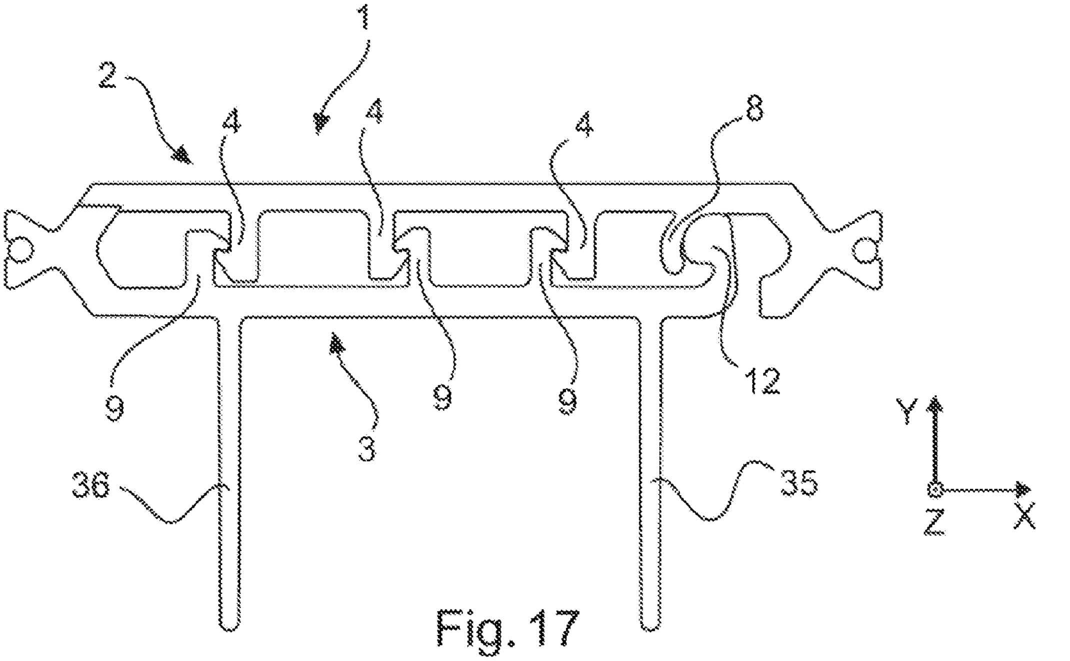
FIG. 17 is a side view of another exemplary embodiment of a profiled plastic section with three hook pairs.

FIG. 17 shows another exemplary embodiment of a profiled plastic section 1, which is similar to the profiled plastic section 1 according to FIG. 1. According to FIG. 17, the profiled plastic section 1 has three hook pairs, which each comprise a first hook 4 and a second hook 9, and are arranged next to each other and spaced apart relative to each other in the width direction x of the profiled plastic section 1. The two right hook pairs on FIG. 17 here replace the transverse webs 5, 10 and 6, 11 according to the exemplary embodiment on FIG. 1, and ensure an especially secure cohesion of the profiled elements 2, 3 in the height direction y of the profiled plastic section 1. The three hook pairs further act to stabilize the profiled plastic section 1 in its central area, and to prevent a bulging of the profiled plastic section 1 in the central area. In addition, the groove 8 and sliding lug 12 are mirror-inverted by comparison to the exemplary embodiment according to FIG. 1. This arrangement enables an especially high load transfer in the pulling direction.

Figure 18:
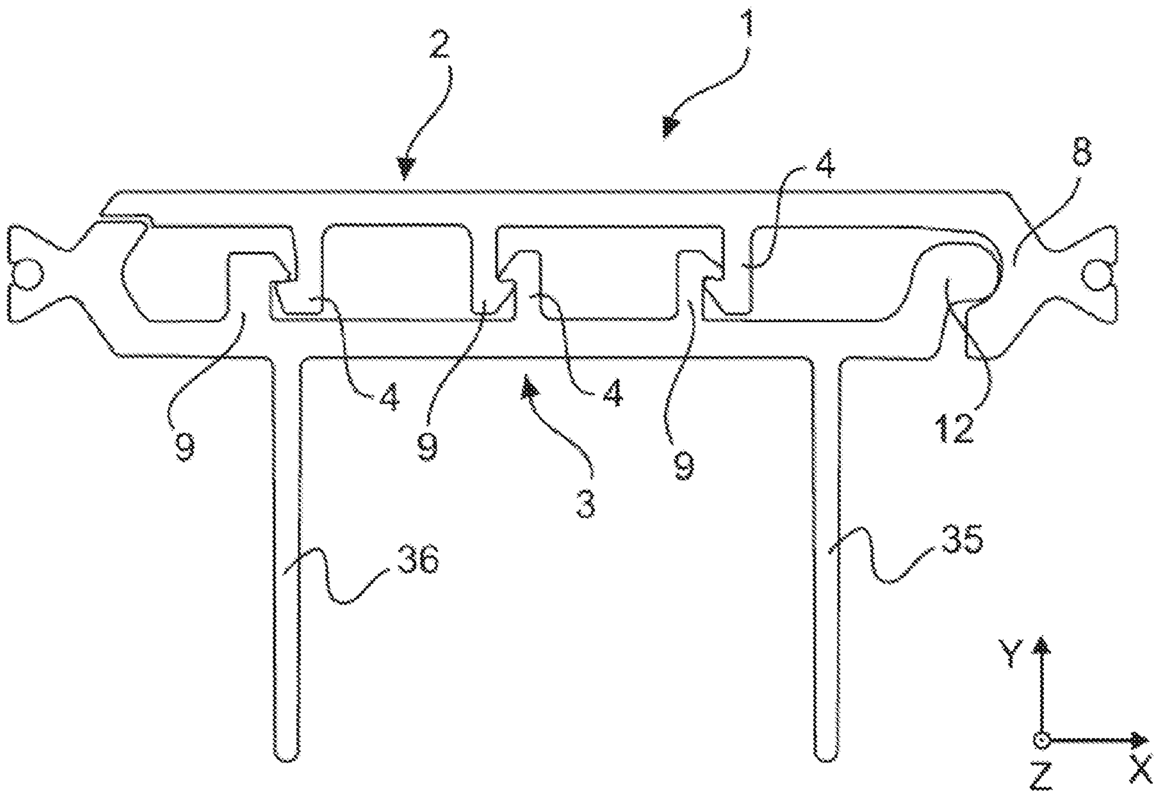
FIG. 18 is a side view of another exemplary embodiment of a profiled plastic section with three hook pairs.

FIG. 18 shows another exemplary embodiment of a profiled plastic section 1, which differs from the profiled plastic section according to FIG. 17 in that the groove 8 and sliding lug 12 are oriented as in the exemplary embodiment according to FIG. 1. The hooks 4, 9 according to FIGS. 17 and 18 can also be undercut in design, as illustrated on FIG. 14.

FIG. 19*a* shows isolated profiled elements 2 and 3 that are present on FIG. 19*b* as an assembled profiled plastic section 1. For connection purposes, the profiled elements 2 and 3 each have cross sections corresponding to each other. This diagram presents a strongly exaggerated wall thickness change in the width direction x, which can be configured in such a way as to achieve an ideal ratio between force transfer, heat transfer and material usage. A sliding arrangement or sliding rail 13 is assembled by introducing a sliding lug 12 into a groove 8. Among other things, this is also simplified through a slight elastic deformation of the profiled elements 2 and 3. The height of the sliding lug 12 and depth of the corresponding groove 8 can be adjusted accordingly to the intended purpose. After the sliding lug 12 has been inserted into the groove 8, the profiled elements 2 and 3 can be folded together, wherein two transverse webs 5 and 10 first overlap, after which a latching connection formed by two hooks 4 and 9 engages, and connects the profiled section 1 in a form-fitting manner in the transverse directions x, y. In other words, the profiled elements 2 and 3 can no longer independently move opposite each other within the cross sectional plane x-y. At the same time, however, the profiled elements 2 and 3 can independently move opposite each other in the direction of the z-axis, which runs orthogonally to the x-y plane. This is referred to as a shear-free connection.

As the case with FIG. 19*a*, FIG. 20*a* shows isolated profiled elements 2 and 3, which on FIG. 20*b* are present as an assembled profiled plastic section 1. For connection purposes, the profiled elements 2 and 3 each have cross sections corresponding to each other. This diagram presents a strongly exaggerated wall thickness change in the width direction (x-axis), which can be configured in such a way as to achieve an ideal ratio between force transfer, heat transfer and material usage. A sliding arrangement or sliding rail 13 is assembled by introducing a pointed sliding lug 12 of the first profiled element 2 into a matching groove 8 of the second profiled element 3. Assembly takes place in a manner similar to the one described in conjunction with FIG. 19. Also shown here are corresponding transverse webs 5 and 10, along with a latching connection formed by two hooks 4 and 9. The function of the profiled plastic section 1 on FIG. 20*b* largely corresponds to the function of the profiled plastic section 1 according to FIG. 19*b*.

Figure 21A:
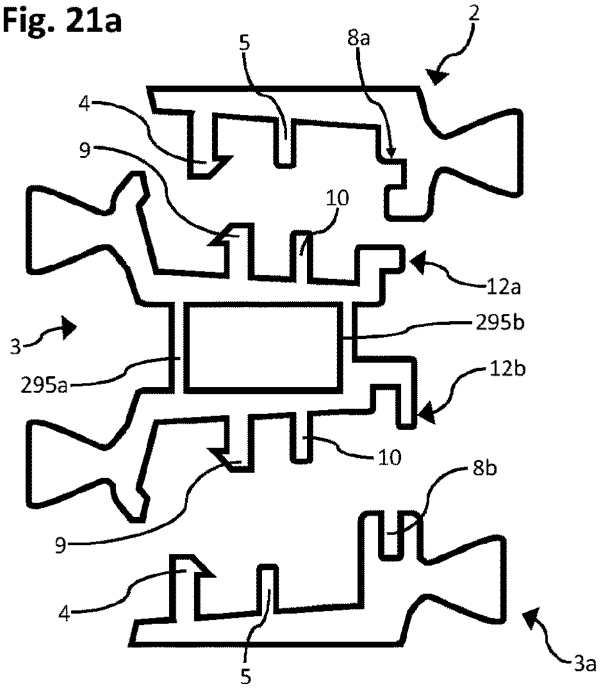
FIG. 21*a* is a side view of another exemplary embodiment of an unsymmetrical profiled plastic section with a large height (in the y-axis) consisting of three profiled elements with a total of four connecting strips and varyingly arranged grooves, wherein the three profiled elements of the profiled plastic section are depicted separate from each other.
Figure 21B:
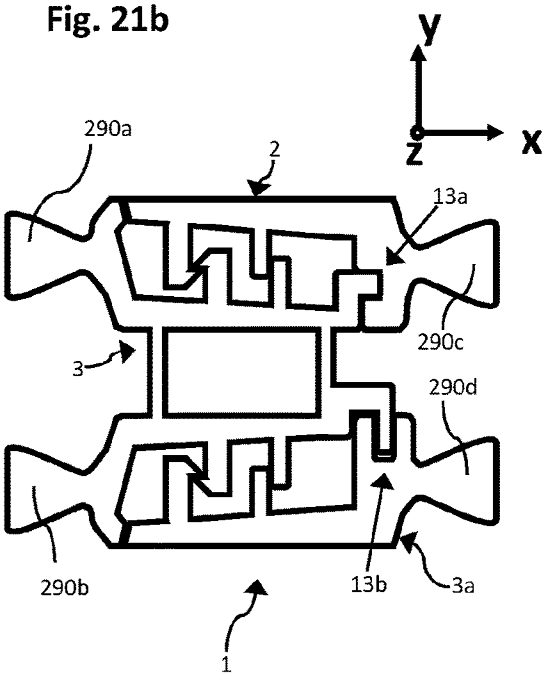
FIG. 21*b* is the profiled plastic section according to FIG. 21*a* in the assembled state.

FIG. 21*a* shows three isolated profiled elements 2, 3 and 3*a*, which are present on FIG. 21*b* as an assembled, complex profiled plastic section 1. What makes this example special is the higher configuration of the profiled plastic section 1 in the y-direction, wherein the assembled profiled plastic section 1 can assume the function of two individual profiled plastic sections, e.g., the functions of the profiled plastic sections 1 according to FIGS. 19 and 20 in a plastic/metal composite profiled section (not shown on FIG. 1, see here the plastic/metal composite profiled sections 31 and 60 from FIG. 4 or 25), and enables additional static advantages owing to braces 295*a* and 295*b*. For connection purposes, the profiled elements 2, 3 and 3*a* each have cross sections corresponding to each other. While this diagram presents a strongly exaggerated wall thickness change in the width direction x known from FIGS. 19 and 20, the latter is not absolutely necessary. The profiled plastic section 1 is assembled in a manner similar to the way already described in conjunction with FIGS. 19 and 20. Also shown here are: corresponding transverse webs 5 and 10, two latching connections each formed by two hooks 4 and 9, and in this example, two differently designed sliding arrangements or sliding rails 13*a* and 13*b*, wherein the first sliding arrangement 13*a* is formed by a sliding lug 12*a* of the second profiled element 3 and a corresponding groove 8*a* in the first profiled element 2.

The second profiled element 3 further has a wider sliding lug 12*b*, which is angularly arranged, runs in the height direction y, and can be inserted into another corresponding groove 8*b* of the third profiled element 3*b* (FIG. 21*b*). The function of the profiled plastic section 1 on FIG. 21*b* expands the function of the simple profiled plastic sections, for example as depicted on FIG. 19*b* or 20*b*. The profiled plastic section 1 thus becomes easier to handle than two individual profiled plastic sections (e.g., the profiled plastic sections 1 according to FIGS. 19 and 20), and the profile statics are likewise advantageous for mechanically demanding end applications. The second profiled element 2 has two connecting strips 290*a* and 290*b* for producing a respective connection with a second metal component (not shown) that is shear-resistant in the z-direction. The first profiled element 2 and third profiled element 3*b* each have a connecting strip 290*c* or 290*d*, which each can separately be connected shear-resistant in the z-direction with a first metal component (not shown). The second profiled element 3 is connected shear-free in the z-direction with the first profiled element 2 and with the third profiled element 3*a*, i.e., the second profiled element 3 can be moved in the longitudinal direction z of the profiled plastic section 1 relative to the first profiled element 2 and relative to the third profiled element 3*a* if the profiled elements 2, 3 and 3*a* are separately connected shear-resistant in the z-direction with profiled metal sections.

Figure 22:
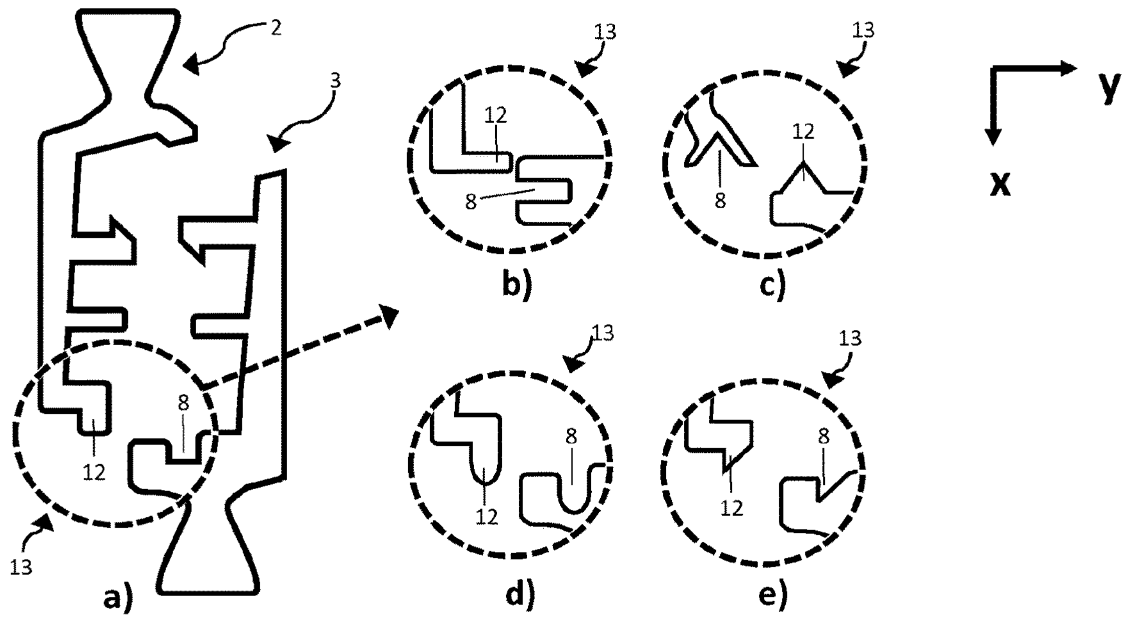
FIG. 22 is a side view of other exemplary embodiments of two profiled elements of an exemplary embodiment of a profiled plastic section according to the invention in an as yet not assembled state, with a varying configuration of components of a sliding arrangement in variants a) to e)

The profiled elements 2 and 3 according to FIG. 22*a*—each turned by 90°—correspond to the profiled elements 2 and 3 according to FIG. 19*a*. FIGS. 22*b* to 22*e* show alternative shapes and optional arrangements for the sliding lug 12 and groove 8 of the respective sliding arrangement 13. FIG. 22*b* shows a sliding lug 12 of the first profiled element 2 running in the y-direction, which can be introduced into a corresponding groove 8 of the second profiled element 3. FIG. 22*c* shows a sliding lug 12 of the second profiled element 3 that is tapered in the width direction x, wherein the sliding lug 12 can be introduced into a corresponding groove 8 of the first profiled element 2. FIG. 22*d* shows a sliding lug 12 of the first profiled element 2 having a rounded distal end, wherein the sliding lug 12 can be introduced into a corresponding groove 8 of the second profiled element 3. FIG. 22*e* further shows a wedge-shaped sliding lug 12 of the first profiled element 3 that is tapered in the width direction x, wherein the sliding lug 12 can be introduced into a corresponding groove 8 of the second profiled element 3.

FIG. 23*a* and FIG. 23*b* show a variation of the profiled plastic section 1 according to FIG. 21*a* and FIG. 21*b*, wherein the second profiled element 3 is here designed with just one connecting strip 390*b*. In addition, the second profiled element 2 has two transverse webs 5, and the two other profiled elements 2, 3*a* each have two corresponding transverse webs 10, wherein the especially strongly overlapping, intermeshing transverse webs 5 and 10 in the interlocked profiled plastic section 1 can absorb both tensile and compressive forces in the width direction x. A total of three connecting strips 390*a*, 390*b* and 390*c* are present in the profiled plastic section 1, wherein the profiled plastic section 1 itself comprises three profiled elements 2, 3 and 3*a*, and wherein the outer profiled elements 2 and 3*a* are identical. FIG. 23*a* depicts loose profiled elements 2, 3 and 3*a*, i.e., the first profiled element 2, the second profiled element 3 and the third profiled element 3*a*. FIG. 23*b* depicts the interlocked state, meaning the assembled, symmetrical profiled plastic section 1 (symmetry axis C2, shown in the middle of the profiled plastic section 1). Likewise shown are corresponding hook pairs 4 and 9 and two sliding arrangements 13, each formed by a sliding lug 12 on the second profiled element 2 with matching groove 8 on the respective accompanying profiled elements 2 and 3*a*.

FIG. 24 illustrates the large-surface overlap $L_D$ of the profiled elements 2 and 3 from FIG. 19 that runs in the width direction (x-axis). For further clarification, the profiled plastic section 1 according to FIG. 19 is to this end shown with the two profiled elements 2 and 3 displaced against each other in the y-direction. The entire width $L_{ges}$ of the profiled plastic section 1 here consists of the widths $L_1$ and $L_2$ of the two profiled elements 2 and 3 minus the overlap $L_D$. Since the overlap does not comprise the area of the connecting elements $LE_1$ and $LE_2$, the width of the profiled plastic section $L_{ges}$ can also be expressed as follows:

$$L_{ges}=L_{E1}+L_{E2}+L_D.$$

Figure 25:
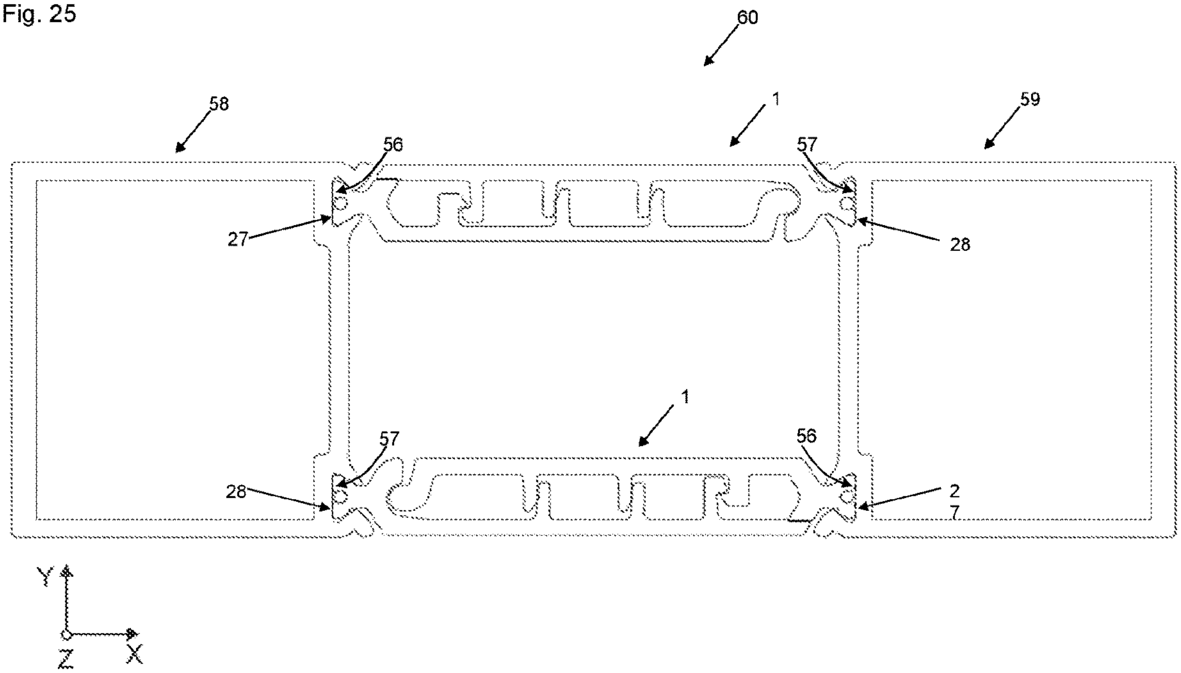
FIG. 25 is a side view of an exemplary embodiment of a metal/plastic composite profiled section according to the invention.

FIG. 25 shows two identical profiled plastic sections 1 arranged one over the other in the height direction y, which each involve an exemplary embodiment of a profiled plastic section 1 according to the invention. The profiled plastic sections 1 are arranged so as to mirror each other relative to the width direction x and height direction y. Similarly to the manner shown on FIGS. 1 to 4, for example, the profiled plastic sections 1 each have two connecting strips 27 and 28, which are accommodated in corresponding receptacles 56 and 57 of a first profiled metal section 58 shown on the left of FIG. 25 and a second profiled metal section 59 shown on the right of FIG. 25, in particular in a shear-resistant manner. The profiled metal sections 58 and 59 can be common parts, which can be made out of aluminum. The profiled plastic sections 1 and profiled metal sections 58, 59 together form a metal/plastic composite profiled section 60. The metal/plastic composite profiled section 60 can be a constituent of a frame (not shown) for a window, door or façade element.

I claim:

1. A profiled plastic section, comprising:

a first profiled element including a first connecting end, a first wall extending away from the first connecting end to a first distal end arranged opposite the first connecting end, and a sliding lug arranged adjacent to the first distal end; and a second profiled element including a second connecting end, a second wall extending away from the first connecting end to a second distal end opposite the second connecting end, and a groove arranged adjacent to the second connecting end and configured to receive the sliding lug;

wherein the first profiled element and the second profiled element are arranged such that the second distal end of the second profiled element is adjacent to the first connecting end of the first profiled element;

wherein the first profiled element and second profiled element together form a sliding arrangement between the first profiled element and second profiled element to permit a free movement of the first profiled element relative to the second profiled element in a longitudinal direction;

wherein a portion of the first profiled element between the first connecting end and the first distal end overlaps with a portion of the second profiled element between the second connecting end and the second distal end in a width direction; and further comprising a first transverse web extending from the first wall of the first profiled element in a height direction towards the second wall of the second profiled element.

2. The profiled plastic section according to claim 1, wherein the sliding lug extends away from the first wall of the first profiled element in a height direction, wherein the height direction is orthogonal to the width direction.

3. The profiled plastic section according to claim 1, wherein the overlap encompasses more than 40% of an entire width of the profiled plastic section, the entire width being defined by a distance between a distal most portion of the first connecting end of the first profiled element and a distal most portion of the second connecting end of the second profiled element.

4. The profiled plastic section according to claim 1, wherein the first connecting end of the first profiled element is configured to be received within a receptacle of a first metal component and extend in the width direction towards a second metal component; and wherein the second connecting end of the second profiled element is configured to be received within a receptacle of the second metal component and extend in the width direction towards the first metal component.

5. The profiled plastic section according to claim 1, wherein the first profiled element and second profiled element form at least one hollow chamber.

6. The profiled plastic section according to claim 1, wherein the first profiled element and the second profiled element together form a first hollow chamber and a second hollow chamber, wherein the second hollow chamber is separated from the first hollow chamber by the first transverse web.

7. The profiled plastic section according to claim 1, further comprising a second transverse web extending from the second wall of the second profiled element in the height direction towards the first wall of the first profiled element.

8. The profiled plastic section according to claim 7, wherein the first transverse web of the first profiled element overlaps with the second transverse web of the second profiled element in the height direction.

9. The profiled plastic section according to claim 1, further comprising a hollow chamber and wherein the first transverse web is arranged in the hollow chamber.

10. The profiled plastic section according to claim 5, wherein the first transverse web is arranged within the at least one hollow chamber.

11. The profiled plastic section according to claim 1, further comprising a hollow chamber formed between the first profiled element and the second profiled element.

12. The profiled plastic section according to claim 11, wherein the first transverse web extends within the hollow chamber.

* * * * *